(12) United States Patent
Wang et al.

(10) Patent No.: US 12,315,278 B2
(45) Date of Patent: May 27, 2025

(54) IMAGE DATA PROCESSING METHOD, APPARATUS AND DEVICE, AND STORAGE MEDIUM

(71) Applicant: Tencent Cloud Computing (Beijing) Co., Ltd., Beijing (CN)

(72) Inventors: Bin Wang, Beijing (CN); Mobai Xue, Beijing (CN); Deqiang Jiang, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 220 days.

(21) Appl. No.: 18/306,208

(22) Filed: Apr. 24, 2023

(65) Prior Publication Data
US 2023/0260304 A1    Aug. 17, 2023

Related U.S. Application Data

(63) Continuation of application No. PCT/CN2021/107653, filed on Jul. 21, 2021.

(30) Foreign Application Priority Data

May 12, 2021  (CN) .......................... 202110518209.7

(51) Int. Cl.
*G06V 30/19*        (2022.01)

(52) U.S. Cl.
CPC .. *G06V 30/19127* (2022.01); *G06V 30/19093* (2022.01)

(58) Field of Classification Search
None
See application file for complete search history.

(56) References Cited

U.S. PATENT DOCUMENTS

| | | | |
|---|---|---|---|
| 2009/0027240 A1* | 1/2009 | Ogura | H04N 19/91 341/67 |
| 2020/0142994 A1 | 5/2020 | Jin et al. | |

(Continued)

FOREIGN PATENT DOCUMENTS

| | | |
|---|---|---|
| CN | 110569846 A | 12/2019 |
| CN | 112148870 A | 12/2020 |
| CN | 112633290 A | 4/2021 |

OTHER PUBLICATIONS

The World Intellectual Property Organization (WIPO) International Search Report for PCT/CN2021/107653 Feb. 10, 2022 6 Pages (including translation).

(Continued)

*Primary Examiner* — Edward Park
(74) *Attorney, Agent, or Firm* — ANOVA LAW GROUP, PLLC

(57) ABSTRACT

Embodiments of this application provide an image data processing method, apparatus and device and a storage medium. The method includes inputting image data including text information into a text recognition model, and acquiring image representation information corresponding to the image data according to a feature extraction component in the text recognition model; obtaining semantic encoding information corresponding to the image representation information according to an image encoding component; acquiring discrete encoding information corresponding to the image representation information according to code tables included in a discrete encoding module; and correcting network parameters of the text recognition model according to an encoding similarity between the semantic encoding information and the discrete encoding information to obtain a target text recognition model.

20 Claims, 10 Drawing Sheets

(56) References Cited

U.S. PATENT DOCUMENTS

| | | |
|---|---|---|
| 2021/0081729 A1 | 3/2021 | Huang et al. |
| 2022/0222920 A1* | 7/2022 | Huang .................. G06V 10/76 |
| 2022/0415071 A1* | 12/2022 | Zhang ................. G06V 30/274 |
| 2023/0032728 A1* | 2/2023 | Hao ....................... G06V 20/46 |
| 2023/0260304 A1* | 8/2023 | Wang .............. G06V 30/18057 |
| | | 382/100 |

OTHER PUBLICATIONS

Alexei Baevski et al., "wav2vec 2.0: A Framework for Self-Supervised Learning of Speech Representations",Cornell University. Oct. 22, 2020.

Steffen Schneider et al., "wav2vec: Unsupervised Pre-training for Speech Recognition",Cornell University. Sep. 11, 2019.

Herve Jeguo et al.,"Product Quantization for Nearest Neighbor Search", IEEE Transactions on Pattern Analysis and Machine Intelligence, vol. 33, Jan. 1, 2011.

* cited by examiner

IMAGE DATA PROCESSING METHOD, APPARATUS AND DEVICE, AND STORAGE MEDIUM

RELATED APPLICATIONS

This application is a continuation of PCT Application No. PCT/CN2021/107653, filed on Jul. 21, 2021, which in turn claims priority to Chinese Patent Application No. 202110518209.7, entitled "IMAGE DATA PROCESSING METHOD, APPARATUS AND DEVICE, AND MEDIUM" filed on May 12, 2021. The two applications are both incorporated by reference in their entirety.

FIELD OF THE TECHNOLOGY

This application relates to the technical field of artificial intelligence, and in particular, to an image data processing method, apparatus and device, and a storage medium.

BACKGROUND OF THE DISCLOSURE

Optical Character Recognition (OCR) refers to recognizing optical characters through an image processing and mode recognition technology, thereby outputting character information in images.

An OCR model can be used for recognizing the images including the character information and extracting the character information in the images. Before the OCR model is adopted to recognize the images, model training needs to be performed by a large amount of labeled image data. However, image annotation work consumes much manpower and time, which would cause high annotation cost of the image data. During image annotation, images in a specific scenario are usually labeled, and when the OCR model obtained based on labeled image training is applied to the rest of scenarios, the accuracy of character recognition is likely to be low.

SUMMARY

Embodiments of this application provide an image data processing method, apparatus and device and a storage medium, which can reduce data annotation cost and improve the effectiveness of a text recognition model.

One aspect of the embodiment of this application provides an image data processing method, including:
  inputting image data comprising text information into a text recognition model, and acquiring image representation information corresponding to the image data according to a feature extraction component in the text recognition model;
  encoding the image representation information according to an image encoding component in the text recognition model to obtain semantic encoding information corresponding to the image representation information, the semantic encoding information being associated with the text information in the image data;
  acquiring discrete encoding information corresponding to the image representation information according to code tables in a discrete encoding component of the text recognition model, each code table comprising learnable encoded vectors representing text features, and the discrete encoding information being a fitting target for unsupervised learning; and
  correcting network parameters of the text recognition model according to an encoding similarity between the semantic encoding information and the discrete encoding information, and identifying the feature extraction component with corrected parameters and the image encoding component with corrected parameters as a target text recognition model, the target text recognition model being configured to recognize text information in image data.

Another aspect of the embodiment of this application provides an image data processing apparatus, including:
  a feature extraction module configured to input image data comprising text information into a text recognition model, and acquire image representation information corresponding to the image data according to a feature extraction component in the text recognition model;
  a semantic encoding module configured to code the image representation information according to an image encoding component in the text recognition model to obtain semantic encoding information corresponding to the image representation information, the semantic encoding information being associated with the text information in the image data;
  a discrete encoding module configured to acquire discrete encoding information corresponding to the image representation information according to code tables in a discrete encoding component of the text recognition model, each code table comprising learnable encoded vectors representing text features, and the discrete encoding information being a fitting target for unsupervised learning; and
  a parameter correction module configured to correct network parameters of the text recognition model according to an encoding similarity between the semantic encoding information and the discrete encoding information and identify the feature extraction component with the corrected parameters and the image encoding component with the corrected parameters as a target text recognition model, the target text recognition model being configured to recognize text information in image data.

Another aspect of the embodiment of this application provides a non-transitory computer-readable storage medium storing a computer program. The computer program is applicable to being loaded and executed by a processor so as to enable a computer device with the processor to execute the method provided in any aspect of the embodiment of this application.

In the embodiment of this application, a text recognition model may include a feature extraction component, an image encoding component and a discrete encoding component; the feature extraction component can acquire image representation information of image data, the image encoding component can obtain semantic encoding information through the image representation information, the discrete encoding component can obtain discrete encoding information through the discrete encoding component, then, network parameters of the text recognition model can be corrected through an encoding similarity between the semantic encoding information and the discrete encoding information, that is, the discrete encoding information can serve as a fitting target in the training process of the text recognition model, and annotation information of the image data does not need to be used in the above training process, which can reduce data annotation cost; and since unlabeled image data has diversity characteristics of a large data volume, a wide coverage area and the like, the unlabeled image data is directly used for training, which can improve generalization ability of a target text recognition model, to improve effectiveness of the target text recognition model.

BRIEF DESCRIPTION OF THE DRAWINGS

In order to describe technical solutions in embodiments of this application or in the related art more clearly, drawings required to be used in descriptions of the embodiments or the related art will be simply introduced below, obviously, the drawings described below are only some embodiments of this application, and those of ordinary skill in the art can obtain other drawings according to the drawings without creative work.

DESCRIPTION OF EMBODIMENTS

Figure 1:
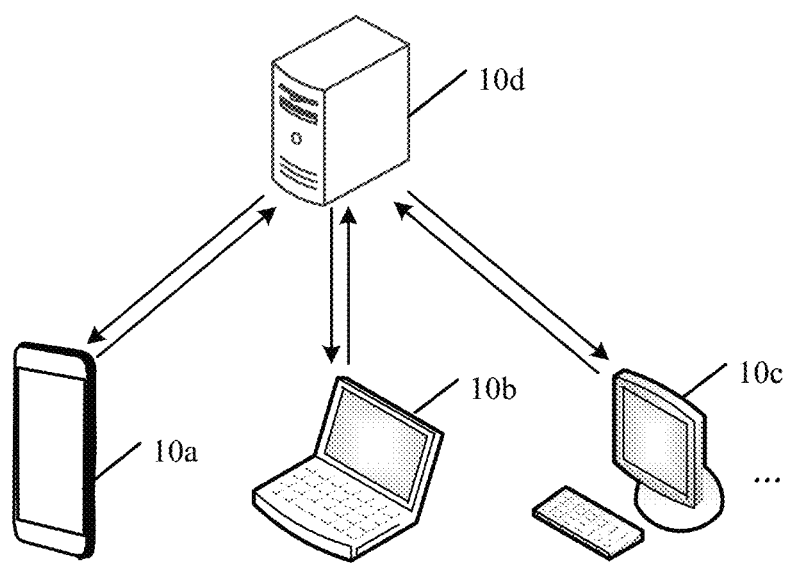
FIG. 1 is a schematic structural diagram of a network architecture according to an embodiment of this application.

Technical solutions in embodiments of this application are clearly and completely described below in combination with drawings in the embodiments of this application, and it is apparent that the described embodiments are only a part rather all of embodiments of this application. All other embodiments obtained by those of ordinary skill in the art based on the embodiments of this application without making creative efforts shall fall within the scope of protection of this application.

This application relates to an Artificial Intelligence (AI) technology, a Block Chain technology and a cloud technology. This application particularly relates to a Computer Vision (CV) technology subordinate to the artificial intelligence technology.

In some embodiments, both image data and a text recognition result involved in this application can be stored on a blockchain, so as to ensure that the image data and the text recognition result are tamperproof.

In some embodiments, this application relates to an artificial intelligence cloud service subordinate to the cloud technology, which may also be called as AI as a Service (AIaaS). This application can use an AI framework and an AI infrastructure provided by a platform to deploy OCR services. After an OCR model is obtained through training, the trained OCR model can be applied to the OCR services in the artificial intelligence cloud service.

This application further relates to following several concepts:

OCR technology: the OCR technology is a computer input technology, which converts characters of various bills, journals, books, manuscripts and other presswork into image information through scanning and other optional input methods, and then utilizes a character recognition technology for converting the image information to be accessible. In other words, through the OCR technology, important data such as money, an account number and literal data can be directly extracted from the images, and a new text needed in daily life is generated, which replaces manual text data input by people.

Unsupervised training also called as unsupervised learning or self-supervised learning or non-supervised learning: unsupervised training is used for processing sample sets with categories unlabeled. In unsupervised training, sample data is not labeled, and there is no certain result neither. Due to the unknown sample data categories, the sample sets need to be classified according to a similarity between the sample data, which attempts to minimize a difference within the same category, and maximize a difference between different categories.

Supervised training also called as supervised learning or teacher-available learning: supervised training is a process in which a group of sample data with the known category can be utilized for adjusting parameters of a network model, and thus, the network model can reach required performance. In supervised training, training data set requirements include input (features) and output (targets), and the targets in a training data set can be manually labeled; and an optimal model is obtained through training via the existing training data set (the existing sample data and corresponding output thereof), and the optimal model is utilized for mapping all input into corresponding output and simply judging the output, thereby achieving a purpose of classification.

Please refer to FIG. 1, and FIG. 1 is a schematic structural diagram of a network architecture according to an embodiment of this application. As shown in FIG. 1, the network architecture may include a server 10d and a user terminal cluster. The user terminal cluster may include one or more user terminals, and the number of the user terminals is not limited herein. As shown in FIG. 1, the user terminal cluster may specifically include a user terminal 10a, a user terminal 10b, a user terminal 10c, etc. The server 10d may be an independent physical server, or a server cluster formed by a plurality of physical servers, or a distributed system, and may also be a cloud server providing basic cloud computing services such as cloud services, cloud databases, cloud computing, cloud functions, cloud storage, network services, cloud communication, middleware services, domain name services, security services, Content Delivery Network (CDN), big data and an artificial intelligence platform. The user terminal 10a, the user terminal 10b, the user terminal 10c, etc. all can include: a smart phone, a tablet personal computer, a notebook computer, a palmtop, a Mobile Internet Device (MID), a wearable device (e.g., a smart watch and a smart bracelet), a smart television and other intelligent terminals with a text recognition function. As shown in FIG. 1, the user terminal 10a, the user terminal 10b, the user terminal 10c, etc. can be in network connection with the server 10d so that each user terminal can perform data interaction with the server 10d through network connection.

As shown in FIG. 1, taking the user terminal 10a in the user terminal cluster as an example, the user terminal 10a can collect image data in different scenarios through an electronic device (e.g., a scanner and photography equipment). The image data may include business promotion pictures (e.g., advertising pictures, banner slogan pictures and propaganda pictorial pictures on walls) shot by the photography equipment (e.g., a camera in the user terminal 10a, or peripheral photography equipment having a data transmission channel with the user terminal 10a), literal data pictures scanned by the scanner, etc. The user terminal 10a can acquire an initialized text recognition model also called as an initial text recognition model or an initial OCR model, and train the text recognition model through the collected image data; and the text recognition model may include a feature extraction component, an image encoding component and a discrete encoding component. For each image data inputted into the text recognition model, the feature extraction component can perform feature extraction (image downsampling) on the image data and output image representation information corresponding to the image data, the image encoding component can output semantic encoding information corresponding to the image representation information, the discrete encoding component can output discrete encoding information corresponding to the image representation information, accordingly, network parameters of the text recognition model can be modified through an encoding similarity between the semantic encoding information and the discrete encoding information and a code table index confidence coefficient to obtain the trained text recognition model also called as a target text recognition model, and the trained text recognition model can be used for recognizing text information in to-be-processed image data. In the embodiment of this application, the text recognition model can be trained without using annotation information of the image data, thereby reducing annotation cost of the image data; and due to diversity of the collected image data, the trained text recognition model is more effective.

Figure 2:
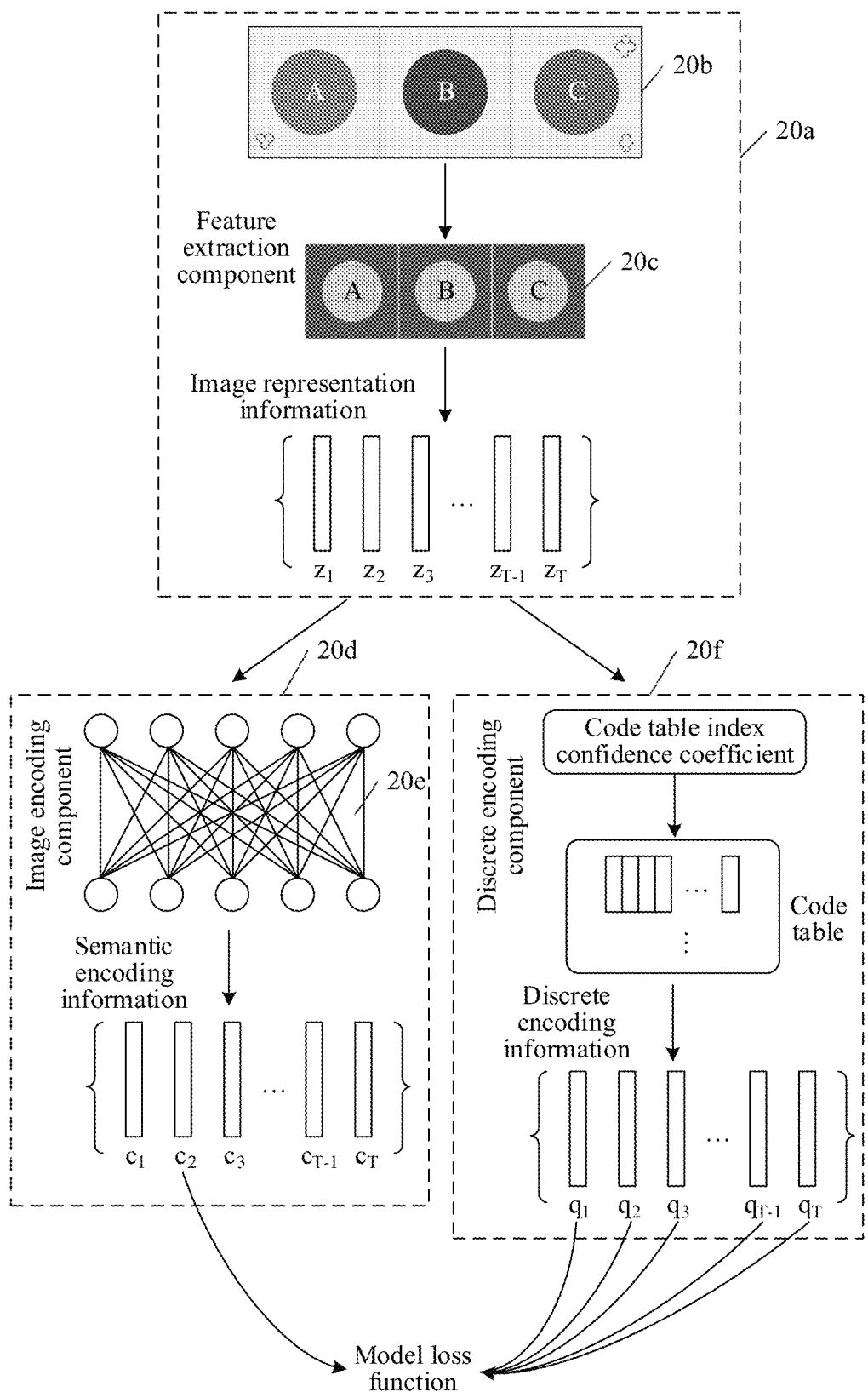
FIG. 2 is a training scenario graph of a text recognition model according to an embodiment of this application.

Please refer to FIG. 2, and FIG. 2 is a training scenario graph of a text recognition model according to an embodiment of this application. Taking the user terminal 10a in the user terminal cluster shown in FIG. 1 as an example below, the text recognition model is trained in an unsupervised training method. As shown in FIG. 2, the user terminal 10a can adopt image data without carrying tag information to train the initialized text recognition model. The text recognition model may include a feature extraction component 20a, an image encoding component 20d and a discrete encoding component 20f. After training, a target text recognition model with the feature extraction component with updated parameters and the image encoding component with updated parameters can be obtained. In other words, in the process of training the text recognition model in the unsupervised training method, training the network parameters of the feature extraction component 20a and the network parameters of the image encoding component 20d is the most important purpose.

As shown in FIG. 2, for a sample image 20b inputted into the text recognition model (the sample image 20b may include text information), the sample image 20b is firstly inputted into the feature extraction component 20a in the text recognition model 20b so as to be subjected to image preprocessing, and the image preprocessing may include but not limited to: image graying, image normalization, image size adjustment and image de-noising processing; if the sample image 20b is a color image, image graying can be performed on the sample image 20b, and the sample image 20b is converted into a grayscale image, thereby reducing computation complexity of the text recognition model in the training process; of course, to further reduce computation complexity in the training process, image normalization can also be performed on the sample image 20b obtained after image graying processing; when the feature extraction component 20a has a size rule on a size of input images, a size of the sample image 20b can be adjusted to a size regulated by the feature extraction component 20a; and accordingly, de-noising processing can be performed on the sample image 20b so as to optimize the sample image 20b, and the like. The user terminal 10a can adopt one or more of above image preprocessing methods to preprocess the sample image 20b, and as a result, a preprocessed image 20c is obtained. Downsampling can be performed on the image 20c by the feature extraction component 20a, image representation information $Z=\{z_1, z_2, z_3, \ldots, z_T\}$ for describing the image 20c is extracted from the image 20c, where, T may refer to a ratio of an image width of the image 20c to an image downsampling rate and may be a positive integer, and when the ratio of the image width to the image downsampling rate is not the positive integer, rounding may be performed on the ratio of the image width to the image downsampling rate. It is to be understood that through downsampling on the image 20c by the feature extraction component 20a, the image representation information of an area where text information is located can be extracted from the image 20c, and in other words, the feature extraction component 20a aims to detect the area where the text information included in the image 20c is located, and extract the image representation information of the area where the text information is located.

Furthermore, the image representation information $Z=\{z_1, z_2, z_3, \ldots, z_T\}$ outputted by the feature extraction component 20a can serve as input data of the image encoding component 20d. The image encoding component 20d may include an encoder 20e, and text position encoding can be performed on the image representation information $Z=\{z_1, z_2, z_3, \ldots, z_T\}$ through the encoder 20e to obtain semantic encoding information $C=\{c_1, c_2, c_3, \ldots, c_T\}$.

The image representation information $Z=\{z_1, z_2, z_3, \ldots, z_T\}$ outputted by the feature extraction component 20a can also serve as input data of the discrete encoding component 20f. The discrete encoding component 20f may include one or more learnable code tables. Each code table inside may include V learnable encoded vectors, where V is a positive integer and may be 1, 2, 3, . . . , and the learnable encoded vectors included in each code table may be constantly updated in the training process. For any image representation feature $z_i$ (where, i is a positive integer less than or equal to T) in the image representation information $Z=\{z_1, z_2, z_3, \ldots z_T\}$, a code table index confidence coefficient between the image representation feature $z_i$ and each of the V learnable encoded vectors in each code table can be calculated. For example, V code table index confidence coefficients between the image representation feature $z_i$ and each code table can be calculated, where, a highest code table index confidence coefficient is selected from the V code table index confidence coefficients, discrete encoding information $Q=\{q_1, q_2, q_3, \ldots, q_T\}$ is acquired according to the learnable encoded vector corresponding to the highest code table index confidence coefficient, and a discrete encoding feature $q_i$ in the discrete encoding information $Q=\{q_1, q_2, q_3, \ldots, q_T\}$ and a semantic encoding feature $c_i$ in the semantic encoding information $C=\{c_1, c_2, c_3, \ldots, c_T\}$ are the same in size.

Furthermore, this application can regard the discrete encoding information $Q=\{q_1, q_2, q_3, \ldots, q_T\}$ as a fitting target of unsupervised training. For example, a model loss function corresponding to the text recognition model can be calculated according to an encoding similarity between the semantic encoding information $C=\{c_1, c_2, c_3, \ldots, c_T\}$ and the discrete encoding information $Q=\{q_1, q_2, q_3, \ldots, q_T\}$ and the code table index confidence coefficient. The network parameters (the network parameters of the feature extraction component 20a, the network parameters of the image encoding component 20d and the code tables in the discrete encoding component 20f may be included) of the text recognition model are optimized by minimizing the model loss function. When the initial text recognition model reaches a training ending condition, the network parameters of the feature extraction component 20a and the network parameters of the image encoding component 20d can be saved at the time to serve as the target text recognition model. In unsupervised training, for the semantic encoding feature $c_i$ in the semantic encoding information $C=\{c_1, c_2, c_3, \ldots, c_T\}$, the discrete encoding feature $q_i$ in the discrete encoding information $Q=\{q_1, q_2, q_3, \ldots, q_T\}$ may serve as a positive sample of the semantic encoding feature $c_i$, a discrete encoding feature $q_j$ (i is not equal to j, and j is a positive integer less than or equal to T) in the discrete encoding information $Q=\{q_1, q_2, q_3, \ldots, q_T\}$ serves as a negative sample of the semantic encoding feature $c_i$. A model loss function is calculated according to an encoding similarity among the semantic encoding feature $c_i$, the positive sample and the negative sample and the code table index confidence coefficient, the network parameters of the text recognition model are modified according to the model loss function, so as to obtain the finally-trained target text recognition model which can be used for recognizing the text information in the to-be-processed image data.

Figure 3:
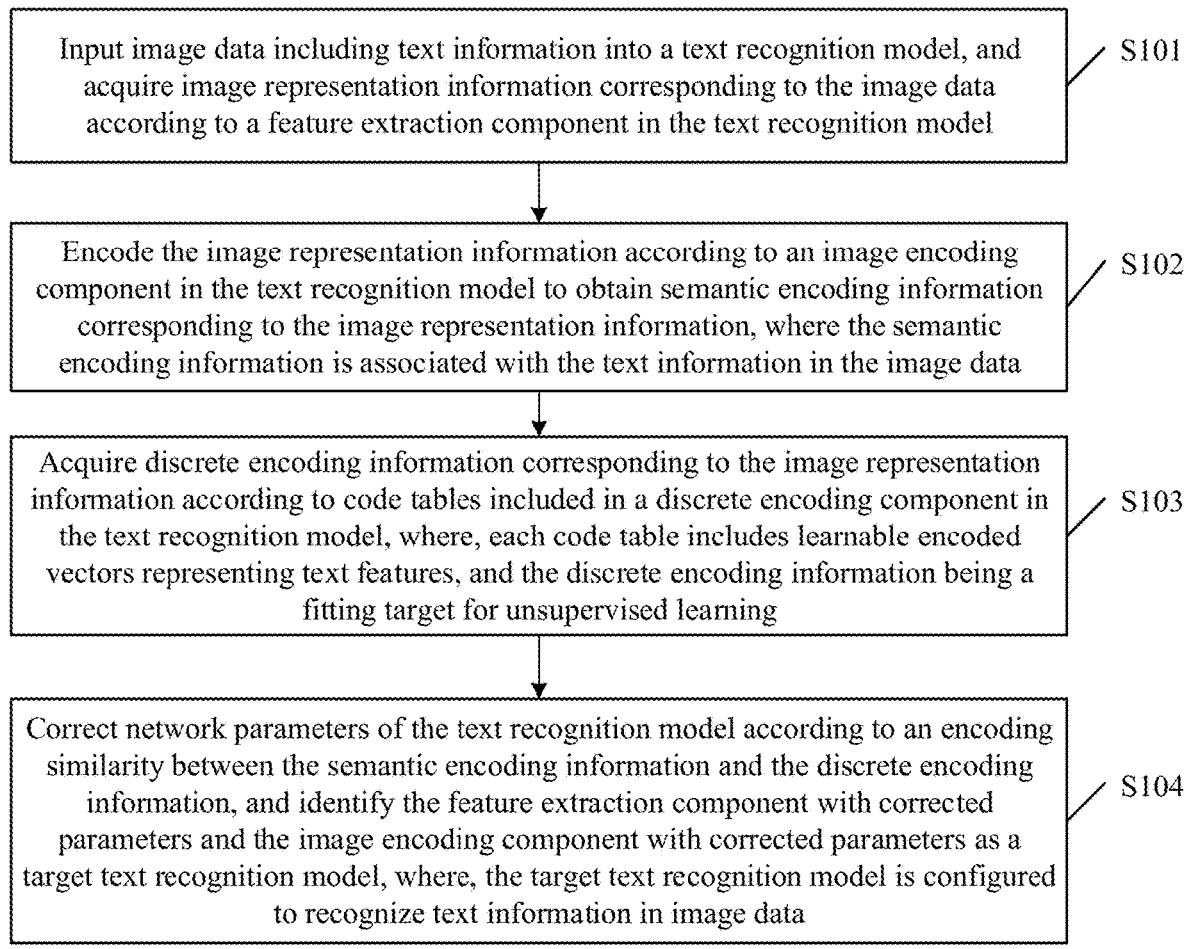
FIG. 3 is a schematic flowchart of an image data processing method according to an embodiment of this application.

Please refer to FIG. 3, and FIG. 3 is a schematic flowchart of an image data processing method according to an embodiment of this application. It is to be understood that the image data processing method can be executed by a computer device, and the computer device may be a user terminal or a server or a system composed of the user terminal and the server, or a computer program application (including program code), which is not specifically limited herein. As shown in FIG. 3, the image data processing method may include the following steps:

S101: Input image data including text information into a text recognition model, and acquire image representation information corresponding to the image data according to a feature extraction component in the text recognition model.

Specifically, in an OCR text recognition application, the text recognition model also called as an OCR model can be used for detecting and recognizing the text information included in the image data so as to output the text information included in the image data. Before the text recognition model is used, an unsupervised training method can be adopted to train the text recognition model, so as to obtain a trained text recognition model. To facilitate description, an initialized text recognition model in the embodiment of this application can be called as an initial text recognition model, and the trained text recognition model is called as a target text recognition model. In addition, the text recognition model may include the feature extraction component, an image encoding component and a discrete encoding component.

After a sample data set used for training the text recognition model is collected, the computer device (e.g., the user terminal 10a in the corresponding embodiment in FIG. 1) can acquire the text recognition model and input image data included in the sample data set into the text recognition model in batches, and the sample data set is utilized for performing unsupervised training on the text recognition model. The image data included in the sample data set includes images including text information. For example, the sample data set may include business promotion pictures (advertising pictures), document scanned pictures, certificate scanned pictures, screenshot and other image data. All the image data included in the sample data set may be unlabeled data (namely, image data without carrying tag information). In the unsupervised training process, the image data in the sample data set can be processed in batches. After the image data included in batch is inputted into the text recognition model, the image data is firstly inputted into the feature extraction component in the text recognition model, and the feature extraction component can perform downsampling on the image data to detect an area where the text information in the image data is located and extract image representation information in the area where the text information is located. The image representation information herein may be represented as $Z=\{z_1, z_2, z_3, \ldots, z_T\}$, T=image width/image downsampling rate, the image representation information may include T image representation features, a dimensionality of each image representation feature may be represented as $R^{G \cdot V}$, for example, when G=2 and V=256, the dimensionality of each image representation feature is 512.

The text recognition model sets a data input format (the data input format at the time may also be understood as a data input format regulated by the feature extraction component) for the inputted image data, and the data input format may be represented as: shape=batch size*channels*height*width, at the time, shape may be represented as the data input format, batch size may be represented as a batch size, height may be represented as an image height corresponding to the image data, and width may be represented as an image width corresponding to the image data; and any image data needs to meet the above data input format, when inputting the feature extraction component, and if the image data does not meet the above dataH input format, the image data can be converted to be in the above data input format. A format of the image representation information may be represented as: shape=batch size*Time step*channel, at the time, shape may be represented as the format of the image representation information, and Time step may be represented as a text sequence length involved in a text recognition scenario. The above feature extraction component may include but not limited to: VGG-Net (a kind of convolutional neural network model may include 16-19 network layers, a size of a convolution kernel used in a convolutional layer may be 3*3, and a size of a filter used in a pooling layer may be 2*2), GoogLeNet (a kind of convolutional neural network model may include 22 network layers, and an inception structure is introduced into the network model and may be configured to improve calculation efficiency), ResNet (a kind of convolutional neural network model may include, by introducing a residual structure, 152 network layers), and DenseNet (a kind of convolutional neural network model in which input of each network layer comes from output of front all network layers).

In some embodiments, when the feature extraction component is the ResNet, assuming that the ResNet includes L network layers, L is a positive integer, such as 1, 2, 3 . . . ; For an $l^{th}$ network layer (l may be a positive integer less than or equal to L) in the ResNet, input of the $l^{th}$ network layer may be represented as $x_{l-1}$, and output may be represented as: $x_l = H_l(x_{l-1}) + x_{l-1}$, where $x_{l-1}$ may be represented as output of a $(l-1)^{th}$ network layer, $H_l$ may be represented as a non-linear transformation function of the $l^{th}$ network layer, and $H_l$ may be understood as a combined operation, such as a series of Batch Normalization (BN), activation functions, pooling, convolution operation and other operations. In other words, output of the $l^{th}$ network layer in the ResNet may be output of the $(l-1)^{th}$ network layer and non-linear transformation of the $(l-1)^{th}$ network layer, and output $x_L$ of a $L^{th}$ network layer (a last network layer) in the ResNet serves as image representation information outputted by the feature extraction component. It is to be explained that, one or more convolutional layers may be included between the $l^{th}$ network layer and the $(l-1)^{th}$ network layer herein.

In some embodiments, when the feature extraction component is the DenseNet, similarly, assuming that the feature extraction component includes L network layers, in the feature extraction component (the DenseNet) of the text recognition model, the computer device may acquire output results of the image data in previous (L−1) network layers and combine the output results corresponding to the previous (L−1) network layers into a combined output result; and then, a target output result corresponding to the combined output result is obtained according to a weight matrix corresponding to the $L^{th}$ network layer in the feature extraction component, and the target output result is determined as image representation information corresponding to the image data. Output of the $L^{th}$ network layer (a last network layer) in the DenseNet may serve as the image representation information outputted by the feature extraction component, and the output of the $L^{th}$ network layer may be represented as: $x_L=H_L([x_0, x_1, \ldots, x_{L-1}])$, where, $x_0$ may be represented as an initialization value in the DenseNet, $x_1$ may be represented as output of a first network layer in the DenseNet, $x_{L-1}$ may be represented as output of an $(L-1)^{th}$ network layer in the DenseNet, $H_L$ may be represented as a weight matrix corresponding to the $L^{th}$ network layer and may also be understood as a weight matrix involved in a non-linear transformation function similar to the above non-linear transformation function $H_l$; and $[x_0, x_1, \ldots, x_{L-1}]$ may be represented as concatenation of output from a layer 0 to the $(L-1)^{th}$ network layer in the DenseNet, and concatenation refers to channel merging (namely, the above combined output result). In other words, for any network layer l (namely, the $l^h$ network layer) in the DenseNet, output of the $l^h$ network layer may be non-linear transformation of the previous $(l-1)^{th}$ network layer after concatenation, and then output $x_L$ of the $L^{th}$ network layer in the DenseNet serves as image representation information outputted by the feature extraction component.

S102: Encode the image representation information according to the image encoding component in the text recognition model to obtain semantic encoding information corresponding to the image representation information. The semantic encoding information is associated with the text information in the image data.

Specifically, after the feature extraction component outputs the image representation information $Z=\{z_1, z_2, z_3, \ldots, z_T\}$, the computer device can input the image representation information into the image encoding component of the text recognition model. The image encoding component can encode the image representation information so as to obtain the semantic encoding information corresponding to the image representation information. The semantic encoding information is associated with the text information included in the image data, and may be represented as $C=\{c_1, c_2, c_3, \ldots, c_T\}$. The image encoding component may be configured to learn semantic information between the text information included in the image data and can focus more on semantically associated terms and weaken uncorrelated terms. The above image encoding component may include but not limited to a Transformer encoder (a kind of encoder model structure) including a mask module, a Long Short-Term Memory (LSTM) and a Recurrent Neural Network (RNN).

In some embodiments, when the image encoding component is the Transformer encoder including the mask module, the Transformer encoder may include a self-attention layer and an encoding layer. The computer device may perform, in the image encoding component of the text recognition model, product operation on the image representation information according to a weight matrix corresponding to the self-attention layer of the image encoding component, and thus an attention output vector corresponding to the image representation information is obtained; and then, text position encoding is performed on the attention output vector according to the encoding layer in the image encoding component, and thus, semantic encoding information corresponding to the image representation information is obtained. For each image representation feature in the image representation information $Z=\{z_1, z_2, z_3, \ldots, z_T\}$, a Query vector, a Key vector and a Value vector corresponding to each image representation feature can be generated through the self-attention layer in the Transformer encoder. The Query vectors corresponding to the T image representation features may form a query matrix QU, the Key vectors corresponding to the T image representation features may form a key matrix KE, and the Value vectors corresponding to the T image representation features may constitute a value matrix VA. The query matrix QU can be obtained after multiplying the image representation information Z by a query weight matrix $W^{QU}$, the key matrix KE can be obtained after multiplying the image representation information Z by a key weight matrix $W^{KE}$, and the value matrix VA can be obtained after multiplying the image representation information Z by a value weight matrix $W^{VA}$. An output result (namely, the attention output vector, and the attention output vectors corresponding to the T image representation features may form an attention output matrix) of the self-attention layer is obtained according to the query matrix QU, the key matrix KE and the value matrix VA, and the output result of the self-attention layer may be represented as: softmax $(QUe(KE)^T/\sqrt{d_{ke}})e$ VA, where, $d_{ke}$ may be represented as a dimension of the Key vector, softmax may be represented as a classifier, and e may be represented as a matrix point multiplication operation. Furthermore, to understand a text sequence corresponding to each image representation feature in the image representation information, the encoding layer in the image encoding component can be adopted to perform text position encoding on the output result of the self-attention layer, and the semantic encoding information $C=\{c_1, c_2, c_3, \ldots, c_T\}$ corresponding to the image representation information is obtained.

S103: Acquire the discrete encoding information corresponding to the image representation information according to the code tables included in the discrete encoding component in the text recognition model.

In some embodiments, a code table index confidence coefficient corresponding to the image representation information is obtained according to the code tables included in the discrete encoding component in the text recognition model, and the discrete encoding information corresponding to the image representation information is acquired from the code tables according to the code table index confidence coefficient; and each code table includes learnable encoded vectors used for representing text features. The code table index confidence coefficient refers to reliability of adopting the learnable encoded vectors to represent the image representation information.

Specifically, the discrete encoding component of the text recognition model may include the code tables, and the code tables may include the learnable encoded vectors for representing the text features. The computer device may acquire the code table index confidence coefficients between all the image representation features in the image representation information and the code tables according to the code tables in the discrete encoding component, and can acquire the discrete encoding information corresponding to the image representation information from the code tables according to an arrangement order, from high to low, of the code table index confidence coefficients.

In some embodiments, each code table in the discrete encoding component may include V learnable encoded vectors, the image representation information may include T image representation features, and V is a positive integer and may be 1, 2, 3, . . . ; the computer device can acquire an image representation feature $z_i$ for the code tables included in the discrete encoding component of the text recognition model in the image representation information, i is a positive integer less than or equal to T, the image representation feature $z_i$ may be represented as any image representation feature included in the image representation information; then, code table index confidence coefficients between the image representation feature $z_i$ and the V learnable encoded vectors can be acquired, where, the code table index confidence coefficient corresponding to the $i^{th}$ learnable encoded vector in the V learnable encoded vectors refers to reliability of adopting the $i^{th}$ learnable encoded vector to represent the image representation feature $z_i$, and for the image representation feature $z_i$, the code table index confidence coefficients corresponding to the V learnable encoded vectors can be acquired, in some embodiments, the sum of the values of the V code table index confidence coefficients is 1, and each code table index confidence coefficient is in a range [0,1]; and in the V learnable encoded vectors, the learnable encoded vector corresponding to the largest code table index confidence coefficient is determined as a target encoded vector, then, a discrete encoding feature $q_i$ corresponding to the image representation feature $z_i$ can be determined according to the target encoded vector, and the discrete encoding features corresponding to the T image representation features form the discrete encoding information.

A method for acquiring a code table index confidence coefficient may include but not limited to a sampling method based on softmax, a sampling method based on gumbel-max, and a sampling method based on gumbel-softmax. In the embodiment of this application, if the sampling method based on gumbel-softmax is adopted to acquire the code table index confidence coefficient, the computer device can acquire a distribution random number (the distribution random number herein may be a gumbel distribution random number) corresponding to a feature value in the image representation feature $z_i$, then, the feature value in the image representation feature $z_i$ and the distribution random number are added to obtain a candidate representation feature corresponding to the image representation feature $z_i$; and code table index confidence coefficients between the candidate representation feature and the V learnable encoded vectors are acquired according to an index value corresponding to the feature value in the candidate representation feature.

In some embodiments, the number of the code tables is G, each code table corresponds to a target encoded vector, and G is a positive integer and may be 1, 2, 3, . . . , where, the value of G and the value of V are associated with the number of characters in the text recognition scenario; the target encoded vectors in the G code tables are spliced to obtain a combined feature corresponding to the image representation feature $z_i$; and then, the combined feature can be inputted to a fully connected network layer, and the discrete encoding feature $q_i$ corresponding to the image representation feature $z_i$ is outputted according to a weight matrix in the fully connected network layer. It is to be understood that G being 1 indicates that there is only one code table which corresponds to one target encoded vector, and thus the step of training and splicing a plurality of target codes to obtain the combined feature does not exist. The target encoded vector corresponding to the code table can directly serve as the combined feature to be inputted into the fully connected network layer, and the discrete encoding feature $q_i$ corresponding to the image representation feature $z_i$ is outputted.

In some embodiments, if the discrete encoding component includes G code tables, each code table may include V learnable encoded vectors e, and a dimensionality of each learnable encoded vector e is a d-dimension ($e \in R^d$), a size of each code table may be represented as: G×V×d. In some embodiments, a learnable tensor codebook $\in R^{G \times V \times d}$ may be created to serve as a code table, and in the process of training the text recognition model, the code table can be constantly updated. Any image representation feature $z_i \in R^{G \cdot V}$ in the image representation information can be expanded into a matrix S with a size being G×V Due to truncated gradient operation possibly existing in the discrete encoding component, when the image representation feature $z_i$ is expanded into the matrix S, transformation of any value cannot be performed, namely, $z_i \to S$, $S \in R^{G \times V}$, and accordingly, the image representation feature $z_i$ represented in a vector form can be expanded into a matrix form.

Furthermore, code table index confidence coefficients between the image representation feature $z_i$ and the V learnable encoded vectors in the code tables can be obtained through the sampling method based on gumbel-softmax, for example, the code table index confidence coefficient can be represented as:

$$p_{g,v} = \frac{\exp\{s_{g,v} + n_v\}/\tau}{\sum_{k=1}^{V} \exp\{s_{g,v} + n_k\}/\tau} \tag{1}$$

$p_{g,v}$ in the above formula (1) may be represented as a code table index confidence coefficient corresponding to a feature value at row g and column v in the matrix S, and for the G code tables, a dimensionality of $p_{g,v}$ may be G; $S_{g,v}$ may be represented as a feature value at row g and column v in the matrix S, $n_v$ may be represented as a Gumbel distribution random number (namely, the above distribution random number) corresponding to the feature value $s_{g,v}$, and the Gumbel distribution random number may be represented as: $n_v = -\log(-\log(U(0,1))$, where, $(U(0,1))$ may represent obeying uniform distribution, and $(s_{g,v}+n_v)$ may be called as a candidate representation feature; and τ may be a nonnegative constant involved in the sampling method based on gumbel-softmax, the constant τ may be used for controlling a smooth degree of gumbel-softmax sampling, the larger the constant τ is, the smoother generated gumbel distribution becomes, and the lower the constant τ is, the more closely the generated gumel distribution approaches disperse one-hot distribution. In the initial stage of training of the text recognition model, due to network instability, the constant τ may be set to be larger (for example, the constant τ may be set as 2) to avoid situations such as gradient explosion or disappearance. In the training process of the text recognition model, the constant T may be gradually reduced, and may be multiplied by a coefficient less than 1 (for example, the coefficient may be set as 0.9995) at every time of iteration (epoch, the number of times of completely training the sample data set), which can enable Gumbel distribution to approach real discrete distribution step by step under the situation of ensuring stable network convergence.

Furthermore, after the V code table index confidence coefficients associated with the image representation feature $z_i$ are calculated according to the above formula (1), a code table index Idx corresponding to the largest code table index confidence coefficient can be obtained and is the same with the code table index confidence coefficient $p_{g,v}$ in dimensionality, and the code table index Idx may be represented as:

$$Idx = \underset{v}{\mathrm{argmax}}(p_{g,v}), Idx \in {}_1{}^G \quad (2)$$

After the code table index Idx is determined according to the above formula (2), one learnable encoded vector can be selected from the G code tables, all the learnable encoded vectors selected from the G code tables may be called as target encoded vectors, in other words, one target encoded vector can be obtained from each code table based on the code table index Idx, the target encoded vectors obtained from the G code tables are spliced to obtain a combined feature E corresponding to the image representation feature $z_i$, and in other words, through the G code tables and the code table index Idx, the combined feature $E=\{e_1, e_2, \ldots, e_G\}$, $E \in R^{G.d}$; the combined feature is inputted to the fully connected network layer, and the discrete encoding feature $q_i$ corresponding to the image representation feature $z_i$ is outputted according to the weight matrix in the fully connected network layer, and the discrete encoding feature $q_i$ may be represented as:

$$q_i = EW + b, W \in R^{G.d \times G.v} \quad (3)$$

W in the above formula (3) may be represented as the weight matrix in the fully connected network layer, b may be represented as offset in the fully connected network layer, and a size of W is G.d×G.V. According to the above formulas (1) to (3), a discrete encoding feature corresponding to each image representation feature can be calculated, the discrete encoding features corresponding to the image representation features are combined, and then the discrete encoding information $Q=\{q_1, q_2, q_3, \ldots, q_T\}$ can be obtained.

It is to be explained that, the description like G.d involved in the embodiment of this application represents a product of two values, for example, when G=2, d=4, G.d represents 8, which can be understood as an 8-dimensional vector, the description like d×G may be represented as a two-dimensional matrix, and for example, when G=2, d=4, d×G represents a matrix with a size being 4×2. In some embodiments, the size of the code tables can be constructed according to the actual demands. For example, when the number of common character categories is about 40000, G may be set as 2, V is set as 256, and accordingly, the number of text features represented by the code tables is $V^G=256^2$.

Figure 4:
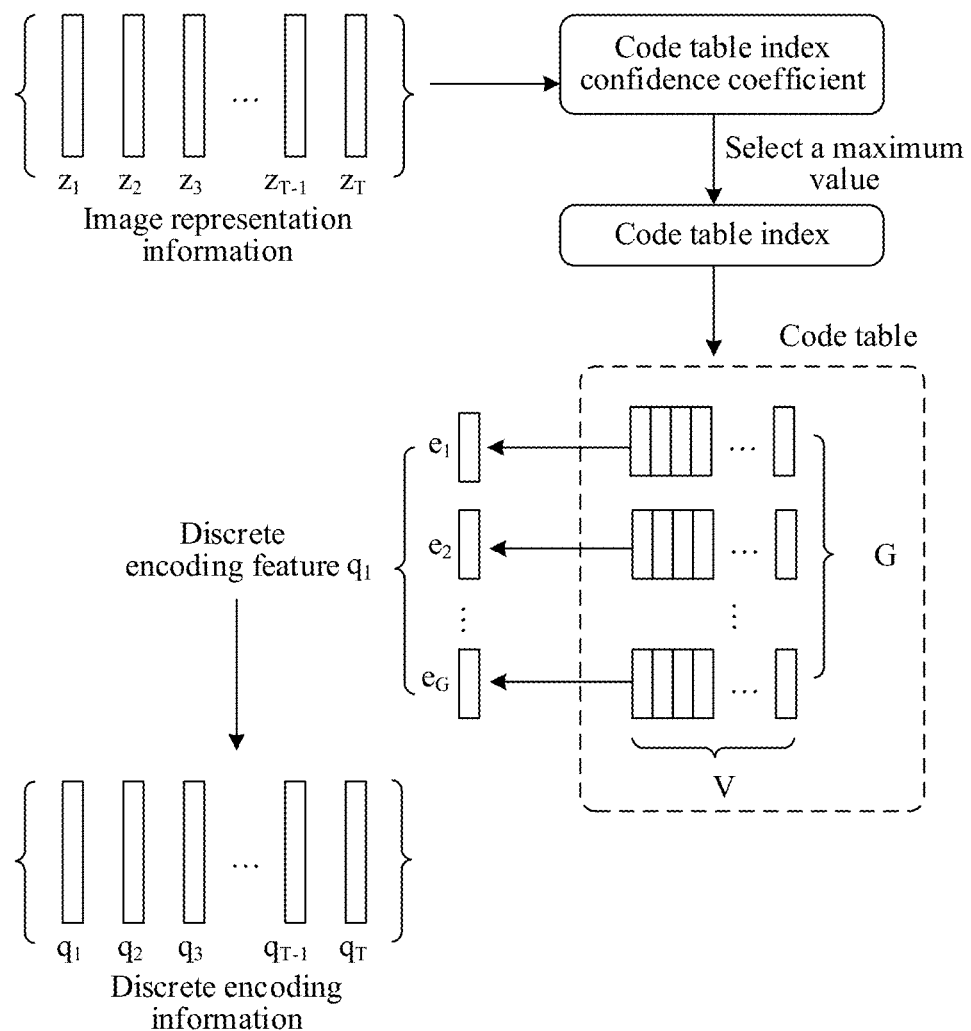
FIG. 4 is a processing schematic diagram of a discrete encoding component according to an embodiment of this application.

Please refer to FIG. 4, and FIG. 4 is a processing schematic diagram of a discrete encoding component according to an embodiment of this application. As shown in FIG. 4, after the image representation information $Z=\{z_1, z_2, z_3, \ldots, z_T\}$ is outputted by the feature extraction component, the image representation information Z may be inputted to the discrete encoding component. The discrete encoding component includes G learnable code tables. Each code table inside includes V learnable encoded vectors. Each image representation feature included in the image representation information Z may be expanded into the matrix with the size being G×V, and accordingly, V code table index confidence coefficients with a dimensionality being 2 can be calculated through the above formula (1). The largest code table index confidence coefficient is selected from the V code table index confidence coefficients corresponding to each code table, and then, the code table index (the above formula (2)) corresponding to the largest code table index confidence coefficient is determined. One learnable encoded vector can be selected from each of the G code tables according to the code table index to serve as the target encoded vector, the G target encoded vectors are spliced, and the discrete encoding feature (calculated according to the above formula (3)) corresponding to each image representation feature can be obtained through one fully connected network layer. For example, the discrete encoding feature corresponding to the image representation feature $z_i$ may be represented as $q_1$, and the discrete encoding features corresponding to the T image representation features are combined to obtain the discrete encoding information $Q=\{q_1, q_2, q_3, \ldots, q_T\}$.

S104: Correct the network parameters of the text recognition model according to an encoding similarity between the semantic encoding information and the discrete encoding information, and determine the feature extraction component with corrected parameters and the image encoding component with corrected parameters as a target text recognition model, where, the target text recognition model is configured to recognize the text information in the to-be-processed image data.

Specifically, in the training process of the text recognition model, a network optimization goal of the text recognition model can be determined according to the encoding similarity between the semantic encoding information and the discrete encoding information, and may also be called as the model loss function. The computer device may acquire the semantic encoding feature $c_i$ (the semantic encoding feature $c_i$ may be any semantic encoding feature in the semantic encoding information) from the semantic encoding information. The discrete encoding feature $q_i$ in the discrete encoding information may be determined as the positive sample of the semantic encoding feature $c_i$, the discrete encoding feature $q_j$ in the discrete encoding information is determined as the negative sample of the semantic encoding feature $c_i$, where, i and j are positive integers less than or equal to T and are not equal. Accordingly, the model loss function corresponding to the text recognition model can be determined according to a first similarity between the semantic encoding feature $c_i$ and the positive sample, a second similarity between the semantic encoding feature $c_i$ and the negative sample, and the code table index confidence coefficient (the first similarity and the second similarity at the time may be called as the encoding similarity); and according to the model loss function, the network parameters of the text recognition model are corrected, and the feature extraction component with the corrected parameters and the image encoding component with the corrected parameters are determined as the target text recognition model.

In some embodiments, in the training process of the text recognition model, the model loss function of the text recognition model can be determined according to the encoding similarity between the semantic encoding information and the discrete encoding information, and the code table index confidence coefficient.

In some embodiments, the model loss function may include two parts: a contrastive loss function and a diversity loss function, where, through the contrastive loss function, the semantic encoding information C can search a set of representation information (the above code table) including the positive sample and the negative sample for correct discrete encoding information Q. The network parameters of the text recognition model are optimized by calculating included angle information between the semantic encoding information C and the discrete encoding information Q, so that an included angle between the semantic encoding feature $c_i$ and the positive sample becomes small, and an included angle between the semantic encoding feature $c_i$ and the positive sample becomes large; and the diversity loss function may improve a utilization ratio of the code tables in the discrete encoding component, and improve diversity of generated code table indexes by optimizing information entropy of the code table indexes. Specifically, the computer device can acquire the first similarity between the semantic encoding feature $c_i$ and the positive sample and the second similarity between the semantic encoding feature $c_i$ and the negative sample. The contrastive loss function is determined according to the first similarity and the second similarity, and the contrastive loss function may be represented as:

$$L_m = -\log \frac{\exp(sim(c_i, q_i)/K)}{\sum_j \exp(sim(c_i, q_j))/K} \quad (4)$$

$$sim(a, b) = \frac{a^T b}{\|a\|\|b\|} \quad (5)$$

$L_m$ in the above formula (4) may be represented as the contrastive loss function, $sim(c_i, q_i)$ may be represented as the first similarity between the semantic encoding feature $c_i$ and the positive sample $q_1$, $sim(c_i, q_j)$ may be represented as the second similarity between the semantic encoding feature $c_i$ and the negative sample qj, the first similarity and the second similarity herein both can be cosine similarities, K may be represented as a constant and can be set according to actual needs, the formula (5) shows a cosine similarity computational formula between a vector a and a vector b, $\|a\|$ may be represented as a 2-norm of the vector a, namely, a value obtained after square root extraction of a squared element absolute value in the vector a. When $sim(c_i, q_i)$ is increased or $sim(c_i, q_j)$ is reduced, the contrastive loss function $L_m$ is reduced.

In some embodiments, the computer device can acquire logarithms corresponding to the code table index confidence coefficients, the diversity loss function is determined according to products of the logarithms and the code table index confidence coefficients, and the diversity loss function may be represented as:

$$L_d = \frac{1}{GgV} \sum_{g=1}^{G} -H\{p_g\} = \frac{1}{GgV} \sum_{g=1}^{G} \sum_{v=1}^{V} \bar{p}_{g,v} \log(\bar{p}_{g,v}) \quad (6)$$

In the above formula (6), $L_d$ may be represented as the diversity loss function, H{ } may be represented as the information entropy, and $\bar{p}_{g,v}$ may be represented as the code table index confidence coefficient calculated in the training process. When the code table index confidence coefficient tends to uniform distribution, the diversity loss function $L_d$ is reduced.

Furthermore, the model loss function corresponding to the text recognition model is determined according to the contrastive loss function and the diversity loss function and may be represented as $L=L_m+\alpha L_d$, where $\alpha$ is a hyperparameter used for connecting the contrastive loss function and the diversity loss function, and the model loss function L is the sum of the product of the hyperparameter $\alpha$ and the diversity loss function $L_d$, and the contrastive loss function $L_m$.

Furthermore, the network parameters of the feature extraction component, the network parameters of the image encoding component and the code tables in the discrete encoding component are corrected according to the model loss function $L=L_m+\alpha L_d$; and when the number of times of training corresponding to the text recognition model meets a training end condition (the number of times of training the text recognition model reaches the set largest number of times of training, or training of the text recognition model meets a convergence condition), the feature extraction component and the image encoding component meeting the training end condition are determined as the target text recognition model.

It is to be explained that, calculation by the contrastive loss function refers to an operation between features in the same image data and does not involve an operation between different image data, while the discrete encoding component can learn more code tables, which can guide a training direction of the text recognition model in the unsupervised training process. In the unsupervised training process, the features obtained according to different image data can get close to the code tables, the different code tables get away from one another, and thus, the similar features between different image data get close to one another, and dissimilar features get away from one another. The discrete encoding component avoids the greatly-increased calculated amount due to the operation (may be called as a cross-image operation) between different image data, reduces internal memory requirements, and reduces network training time cost.

Figure 5:
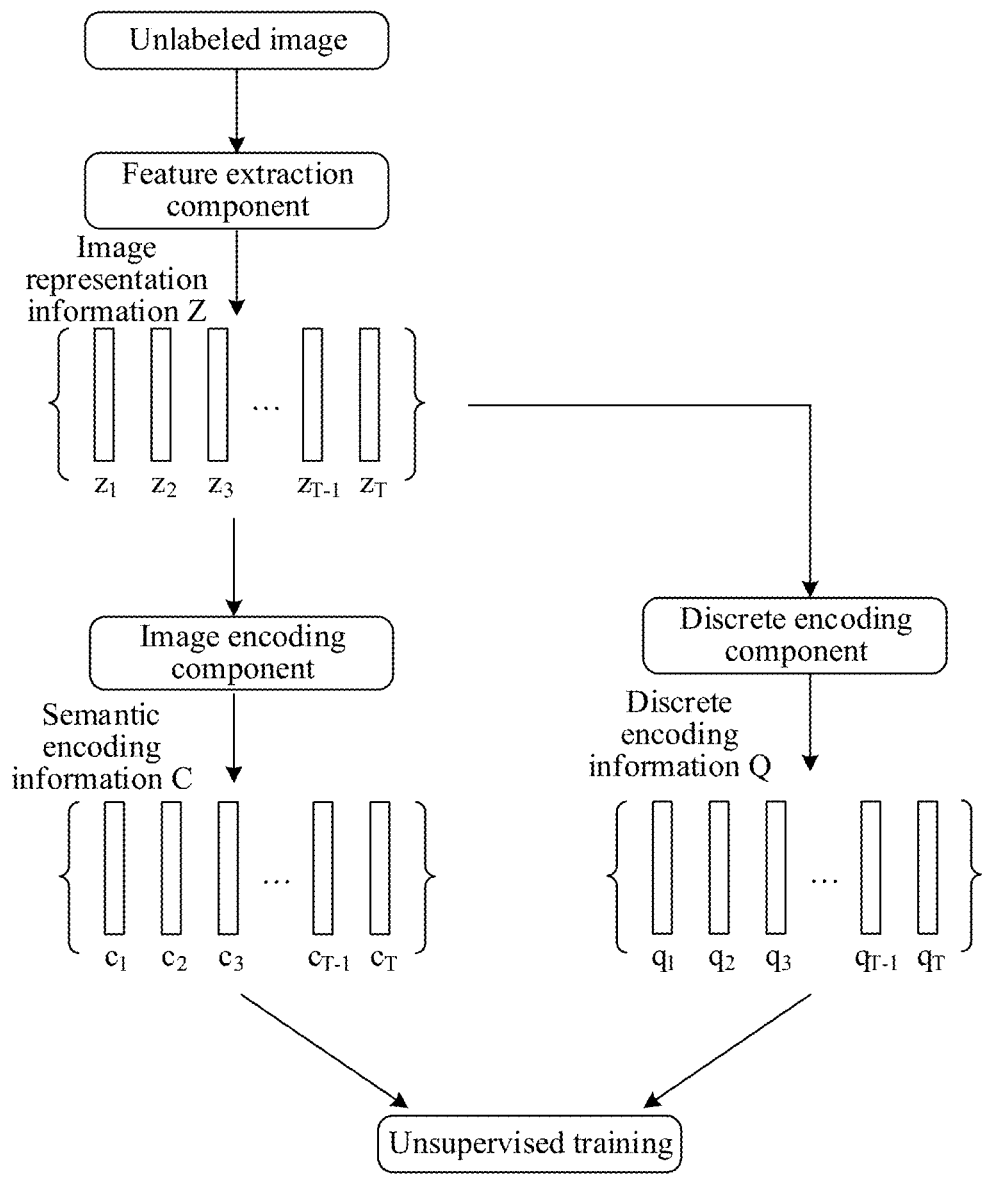
FIG. 5 is a schematic diagram of an unsupervised training method according to an embodiment of this application.

In the embodiment of this application, the whole training process of the text recognition model can be called as the unsupervised training process, the feature extraction component and the image encoding component obtained when the training end condition is met may be called as the trained target text recognition model, and at the time, the target text recognition model can be applied to the text recognition scenario to recognize the text information in the to-be-processed image data. Please refer to FIG. 5, and FIG. 5 is a schematic diagram of an unsupervised training method according to an embodiment of this application. As shown in FIG. 5, a text recognition model may include a feature extraction component, an image encoding component and a discrete encoding component. The feature extraction component can output image representation information $Z=\{z_1, z_2, z_3, \ldots, z_T\}$ corresponding to image data. The image representation information Z can be inputted into two branches, one branch is the image encoding component, the other branch is the discrete encoding component, the image encoding component can output semantic encoding information $C=\{c_1, c_2, c_3, \ldots, c_T\}$ corresponding to the image representation information Z, the discrete encoding component can output discrete encoding information $Q=\{q_1, q_2, q_3, \ldots, q_T\}$ corresponding to the image representation information Z, and the discrete encoding information Q can serve as a fitting target for unsupervised training; and for any semantic encoding feature $c_i$ in the semantic encoding information C, a discrete encoding feature $q_i$ in the discrete encoding information Q may be marked as a positive sample, a discrete encoding feature $q_j$ is marked as a negative sample, and according to the positive sample and the negative sample, losses are calculated, and network parameters of the text recognition model are optimized. Obviously, during unsupervised training, image data for training is images without carrying tag information, and thus annotation cost of the image data can be reduced.

In some embodiments, on the basis of a model obtained through unsupervised training, a small amount of labeled image data can be utilized for finely adjusting the network model (the fine adjustment process may be called as a supervised training process), thereby enhancing robustness of the target text recognition model and then improving effectiveness of the target text recognition model. In the process of finely adjusting the model, the text recognition model may further include a classification network layer which may also be called as a feedforward network; and the network parameters of the text recognition model are corrected according to the semantic encoding information, the discrete encoding information and a code table index confidence coefficient, the feature extraction module with corrected parameters and the image encoding module with corrected parameters are determined as a candidate text recognition model, and in other words, the feature extraction component and the image encoding component obtained after unsupervised training are called as the candidate text recognition model. The computer device may acquire the labeled image data including text information, and the labeled image data is inputted into the candidate text recognition model and may carry the tag information; the labeled semantic information corresponding to the labeled image data is outputted according to the feature extraction component with the corrected parameters and the image encoding component with the corrected parameters in the candidate text recognition model; then, the labeled semantic information is predicted according to the classification network layer, and a prediction text recognition result associated with the text information in the labeled image data is obtained; and according to an error between the tag information and the prediction text recognition result, network parameters of the candidate text recognition model and the classification network layer are corrected, and the candidate text recognition model with the corrected parameters and the classification network layer with the corrected parameters are determined as a target text recognition model. In other words, in supervised training, the tag information of the labeled image data may serve as an expected output result of the candidate text recognition model, and the prediction text recognition result outputted by the candidate text recognition model may be understood as a practical output result. By calculating the error between the expected output result and the practical output result, counter propagation is performed in the candidate text recognition model so as to update the network parameters of the candidate text recognition model and the network parameters of the classification network layer, the trained target text recognition model is finally obtained, and the target text recognition model at the time refers to a network model obtained after unsupervised training and supervised fine adjustment. The classification network layer may include but not limited to: softmax (a kind of multiple classifiers), Artificial Neural Networks (ANNs), and Support Vector Machines (SVM).

Figure 6:
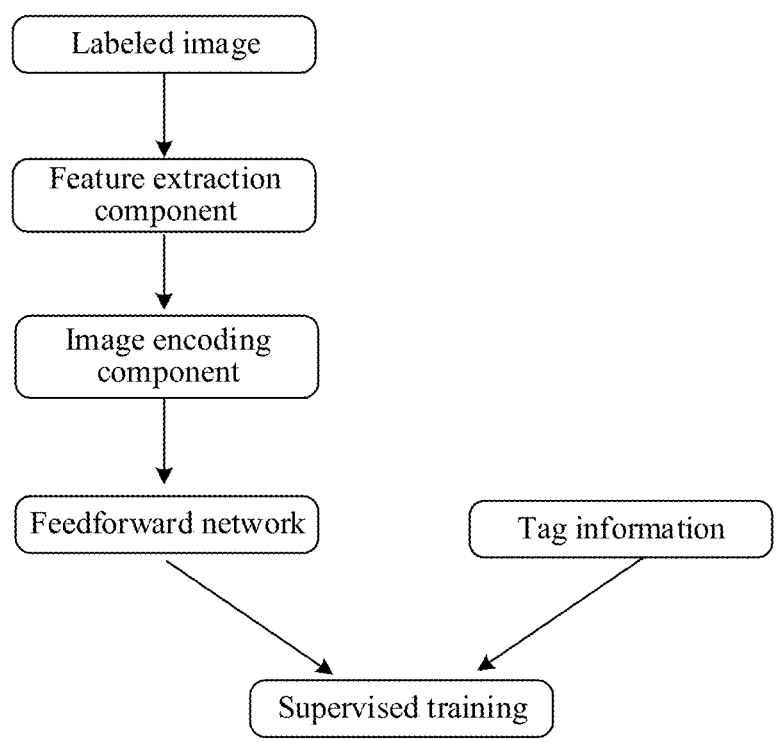
FIG. 6 is a schematic diagram of a supervised training method according to an embodiment of this application.

Please refer to FIG. 6, and FIG. 6 is a schematic diagram of a supervised training method according to an embodiment of this application. As shown in FIG. 6, after unsupervised training, a part of labeled data can be used for performing supervised fine adjustment (may also be called as supervised training) on a model of unsupervised training, and namely, supervised training is performed after unsupervised training; and for labeled images inputted into the candidate text recognition model (the text recognition model obtained after unsupervised training), a process (a forward calculation process) of processing the labeled images in the feature extraction component and the image encoding component is the same with a process of processing unlabeled images in the previous unsupervised training process, which is not repeated herein. After the image encoding component in the candidate text recognition model outputs the labeled semantic information, the labeled semantic information can be inputted into the feedforward network (may be understood as the classification network layer). The feedforward network can output the prediction text recognition result corresponding to the labeled images, where, input of the feedforward network is the labeled semantic information outputted by the image encoding component, output of the feedforward network is a vector, a dimensionality of the vector is equal to the number of text character categories, and if the candidate text recognition model is applicable to recognizing 300 text character categories, the output of the feedforward network may be a vector with a dimensionality being 300. The output vector of the feedforward network may serve as the prediction text recognition result of the labeled images in the candidate text recognition model, then, the error between the tag information of the labeled images and the prediction text recognition result can be calculated to calculate losses, optimize the network parameters of the candidate text recognition model, and the target text recognition model finally trained is obtained.

In some embodiments, after the target text recognition model is obtained through training, the target text recognition model can be applied to any text recognition scenario, such as a delivery address recognition scenario during package sending (the target text recognition model is utilized for recognizing a picture including address information so as to acquire address content in the picture, and automatically fill the recognized address information into an input area with a delivery address, which can simplify delivery address input operation and increase a package sending speed), a business promotion recognition scenario (the target text recognition model is utilized for recognizing an advertising picture so as to acquire advertising text content in the advertising picture), a document input scenario (when literal data in a written document needs to be inputted into an electronic system, the written document can be scanned or photographed, and then, the target text recognition model is utilized for recognizing the scanned or photographed picture so as to acquire document content in the picture and automatically input the recognized document content into the electronic system to be saved, which can reduce human resources and then improve the document content input efficiency), an account number input scenario (when a bank card account number or an identity card number needs to be inputted, a bank card or an identity card can be photographed, and the target text recognition model is utilized for recognizing a photographed picture so as to automatically input the bank card account number or the identity card number, thereby avoiding errors during manual input), a content check scenario (the target text recognition model is utilized for recognizing text information included in a picture to automatically perform content check, thereby reducing manual workloads and improving check efficiency), a picture search scenario (the target text recognition model recognizes text information included in a picture, and recognized text content serves as a keyword for searching), and the like.

For example, when the target text recognition model is applied to the business promotion recognition scenario, the computer device can acquire a business promotion picture including text information, determine the business promotion picture (e.g., an advertising picture) including the text information as to-be-processed image data, and input the to-be-processed image data to the target text recognition model; the feature extraction component with the corrected parameters in the target text recognition model outputs promotion representation information corresponding to the to-be-processed image data; the image encoding component with the corrected parameters in the target text recognition model outputs promotion text semantic information corresponding to the promotion representation information; and according to the classification network layer in the target text recognition model, the promotion text semantic information is predicted to obtain promotion text content corresponding to the promotion text semantic information, that is, the business promotion picture is subjected to text recognition so as to output the promotion text content included in the business promotion picture.

Figure 7:
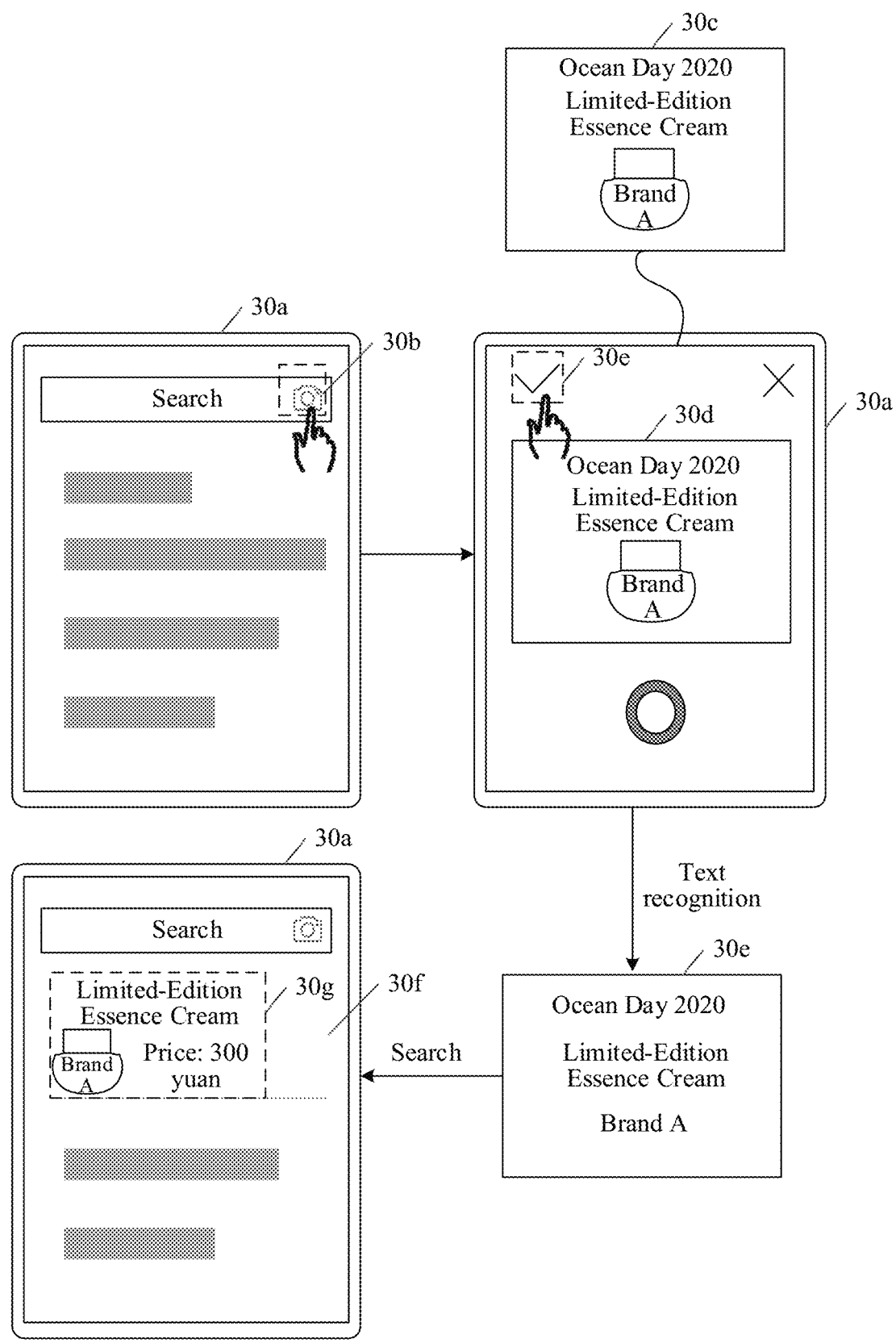
FIG. 7 is a text recognition scenario graph according to an embodiment of this application.

Please refer to FIG. 7, and FIG. 7 is a text recognition scenario graph according to an embodiment of this application. A user terminal 30a shown in FIG. 7 may be the above computer device and may be a terminal device used by a user A, and a search application is installed in the user terminal 30a. A current display interface shown in FIG. 7 is a home page of the search application, the home page can display a search box, the search box may include a photo entry 30b, and when the user A performs trigger operation on the photo entry 30b in the search box, the user terminal 30a can respond to the trigger operation for the photo entry 30b, a camera in the user terminal 30a is started, the user terminal 30a approaches and photographs an actual advertising leaflet 30c, and when the user A obtains a picture 30d through photography and a control 30e is subjected to trigger operation, the user terminal 30a can utilize the pre-trained target recognition model for performing text recognition on the picture 30d, and text content 30e included in the picture 30d is outputted, and includes: "Ocean Day 2020", Limited-Edition Essence Cream" and "Brand A".

Furthermore, after the text content 30e is recognized, the text content 30e serves as the search keyword for retrieving, retrieved results associated with the text content 30e are obtained through retrieving in the search application and displayed in a search page 30f of the search application, and the retrieved results can be displayed in sequence in the search page 30f according to a degree of association between the retrieved results and the above text content 30e. For example, each retrieved result may include a result display column 30g, and when the user A is interested in content in a certain result display column (e.g., the result display column 30g), the user A can click the result display column to check content details.

Figure 8:
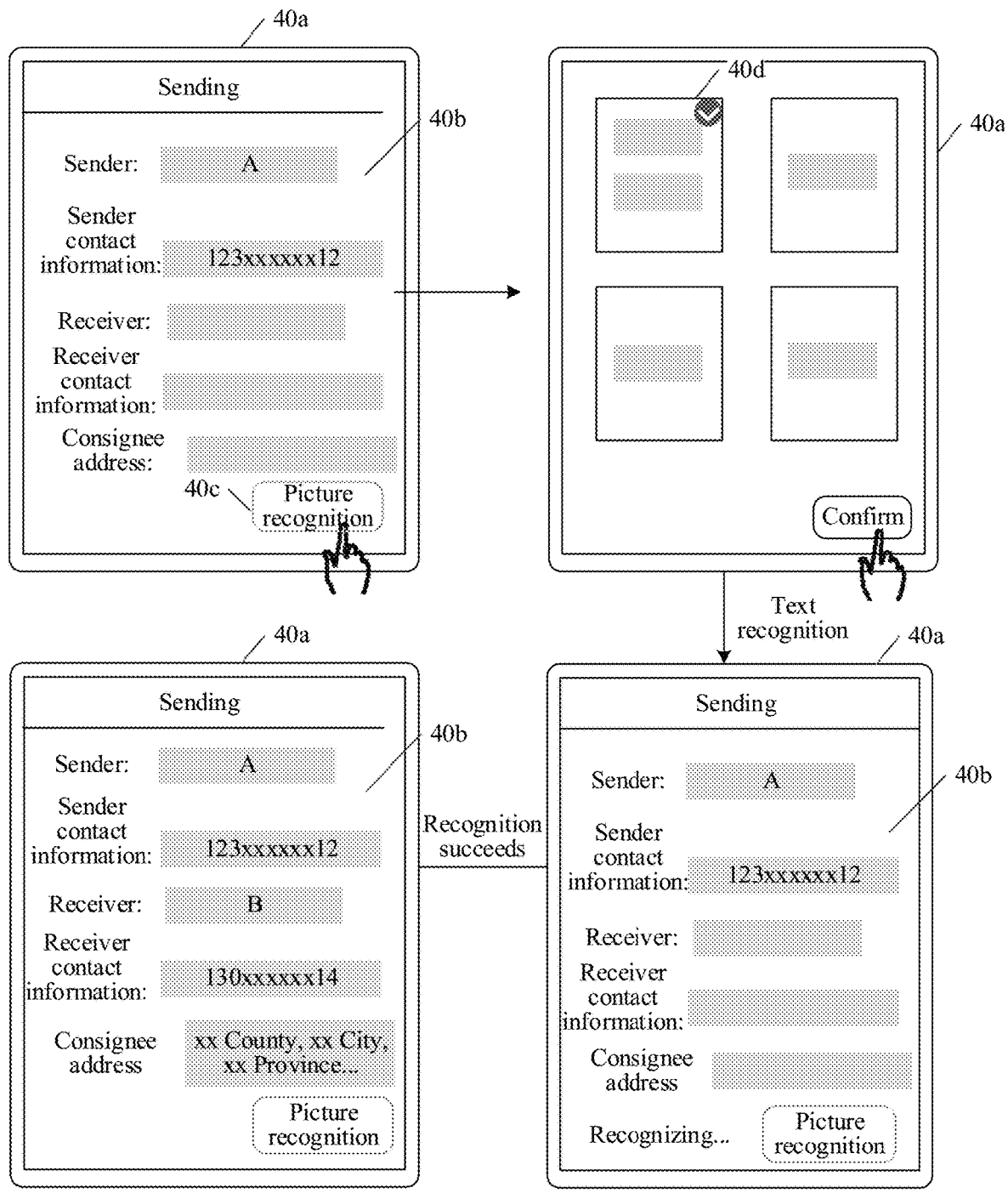
FIG. 8 is a text recognition scenario graph according to an embodiment of this application.

Please refer to FIG. 8, and FIG. 8 is a text recognition scenario graph according to an embodiment of this application. A user terminal 40a shown in FIG. 8 may be the above computer device and may be the terminal device used by the user A, and a package sending application (or a package sending applet) is integrated in the user terminal 30a. When the user A wants to send a package to a user B, the user A can open the package sending application (or the package sending applet) to enter a sending information page 40b in which the user A is required to fill up a sender name, sender contact information, a receiver name, receiver contact information, a receiver delivery address, a postal code and other information. If the user A is unfamiliar with the delivery address of the user B, the user A needs to pre-record the address of the user B on paper or other places and then manually input the delivery address in the sending information page 40b, or input the address on the user terminal 40a through repeated display page switchover.

In some embodiments, when the sending information page 40b includes a picture recognition control 40c, the picture recognition control 40c can be subjected to trigger operation, the user terminal 40a can respond to the trigger operation for the picture recognition control 40c at the time, open a local photo application in the user terminal 40a, select a picture 40d including the delivery address of the user B from the photo application, and perform trigger operation on a confirm control. The user terminal 40a can respond to the trigger operation for the confirm control, the pre-trained target recognition model is utilized for performing text recognition on the picture 40d, outputting text content included in the picture 40d, matching the recognized text content with keywords in the sending information page 40b and automatically filling the matched text content into corresponding input boxes. For example, a receiver column is automatically filled with "B", a receiver contact information column is automatically filled with "130xxxxxx14", a delivery address column is automatically filled with "xx County, xx City, xx Province . . . ", and after the user A checks without problems, the user can perform confirmation and submit information, which can improve the user sending efficiency.

In the embodiment of this application, a text recognition model may include a feature extraction component, an image encoding component and a discrete encoding component; the feature extraction component can acquire image representation information of image data, the image encoding component can obtain semantic encoding information through the image representation information, the discrete encoding component can obtain discrete encoding information through the discrete encoding component, then, network parameters of the text recognition model can be corrected through an encoding similarity between the semantic encoding information and the discrete encoding information, that is, the discrete encoding information can serve as a fitting target in the training process of the text recognition model, and annotation information of the image data does not need to be used in the above training process, which can reduce data annotation cost; and since unlabeled image data has diversity characteristics of a large data volume, a wide coverage area and the like, the unlabeled image data is directly used for training, which can improve generalization ability of the target text recognition model, to improve effectiveness of the target text recognition model and improve applicability of the target text recognition model.

Figure 9:
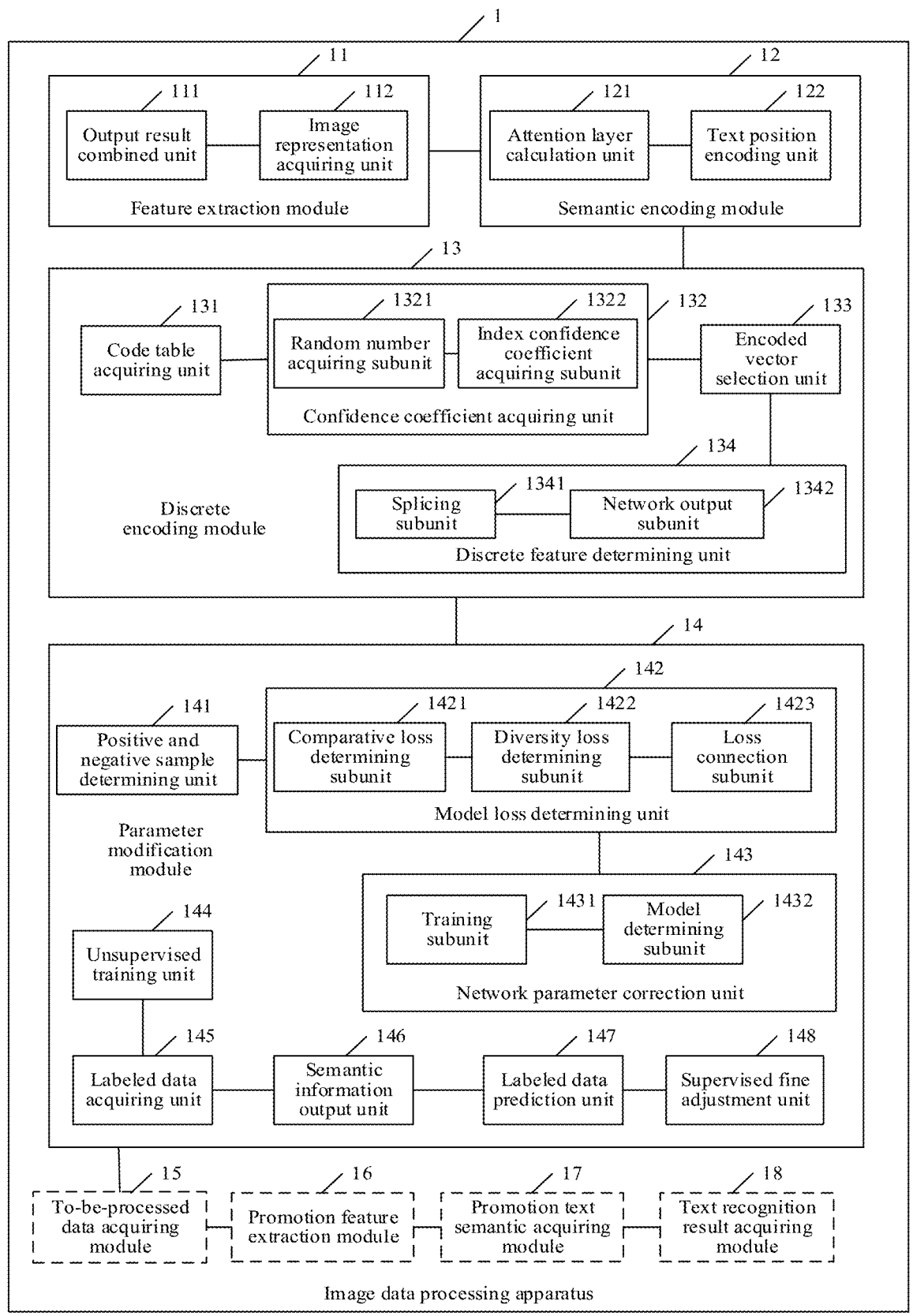
FIG. 9 is a structural schematic diagram of an image data processing apparatus according to an embodiment of this application.

Please refer to FIG. 9, and FIG. 9 is a structural schematic diagram of an image data processing apparatus according to an embodiment of this application. It is to be understood that the image data processing apparatus may be a computer program (including program code) applied to a computer device. For example, the image data processing apparatus may be OCR application software, and can be configured to execute corresponding steps in the method provided by the embodiment of this application. As shown in FIG. 9, the image data processing apparatus 1 may include: a feature extraction module 11, a semantic encoding module 12, a discrete encoding module 13 and a parameter correction module 14;

the feature extraction module 11 configured to input image data including text information into a text recognition model, and acquire image representation information corresponding to the image data according to a feature extraction component in the text recognition model;

the semantic encoding module 12 configured to code the image representation information according to an image encoding component in the text recognition model to obtain semantic encoding information corresponding to the image representation information, where the semantic encoding information is associated with the text information in the image data;

the discrete encoding module 13 configured to acquire discrete encoding information corresponding to the image representation information according to code tables included in a discrete encoding component in the text recognition model, where each code table includes learnable encoded vectors used for representing text features, and the discrete encoding information is used as a fitting target for unsupervised learning; and the parameter correction module 14 configured to correct network parameters of the text recognition model according to an encoding similarity between the semantic encoding information and the discrete encoding information and determine the feature extraction component with the corrected parameters and the image encoding component with the corrected parameters as a target text recognition model, where, the target text recognition model is configured to recognize text information in to-be-processed image data.

For specific embodiments of the feature extraction module 11, the semantic encoding module 12, the discrete encoding module 13 and the parameter correction module 14, refer to steps S101 to S104 in the embodiment corresponding to FIG. 3, and details are not described herein again.

In some embodiments, the discrete encoding module 13 is configured to acquire code table index confidence coefficients corresponding to the image representation information according to the code tables included in the discrete encoding module of the text recognition model; the code table index confidence coefficients refer to reliability of adopting learnable encoded vectors to represent the image representation information; and the discrete encoding information corresponding to the image representation information is acquired from the code tables according to the code table index confidence coefficients.

In some embodiments, the image representation information includes T image representation features, and each code table includes V learnable encoded vectors, where, both T and V are positive integers;

the discrete encoding module 13 may include: a code table acquiring unit 131, a confidence coefficient acquiring unit 132, an encoded vector selection unit 133 and a discrete feature determining unit 134;

the code table acquiring unit 131 is configured to acquire an image representation feature $z_i$ for the code tables included in the discrete encoding component of the text recognition mode in the image representation information, where i is a positive integer less than or equal to T;

the confidence coefficient acquiring unit 132 is configured to acquire code table index confidence coefficients between the image representation feature $z_i$ and the V learnable encoded vectors;

the encoded vector selection unit 133 is configured to determine the learnable encoded vector corresponding to the largest code table index confidence coefficient in the V learnable encoded vectors as a target encoded vector; and the discrete feature determining unit 134 is configured to determine a discrete encoding feature $q_i$ corresponding to the image representation feature $z_i$ according to the target encoded vector, and constitute the discrete encoding information through the discrete encoding features corresponding to the T image representation features.

For specific embodiments of the code table acquiring unit 131, the confidence coefficient acquiring unit 132, the encoded vector selection unit 133 and the discrete feature determining unit 134, refer to step S103 in the embodiment corresponding to FIG. 3, and details are not described herein again.

In some embodiments, the confidence coefficient acquiring unit 132 may include: a random number acquiring subunit 131 and an index confidence coefficient acquiring subunit 132;

the random number acquiring subunit 131 is configured to acquire a distribution random number corresponding to a feature value in the image representation feature $z_i$, and add the feature value in the image representation feature $z_i$ and the distribution random number to obtain a candidate representation feature corresponding to the image representation feature $z_i$; and the index confidence coefficient acquiring subunit 132 is configured to acquire code table index confidence coefficients between the candidate representation feature and the V learnable encoded vectors according to an index value corresponding to the feature value in the candidate representation feature.

For specific embodiments of the random number acquiring subunit 131 and the index confidence coefficient acquiring subunit 132, refer to S103 in the embodiment corresponding to FIG. 3, and details are not described herein again.

In some embodiments, the number of the code tables is G, each code table corresponds to a target encoded vector, and G is a positive integer;

the discrete feature determining unit 134 may include: a splicing subunit 1341 and a network output subunit 1342;

the splicing subunit 1341 is configured to splice the target encoded vectors in the G code tables to obtain a combined feature corresponding to the image representation feature $z_i$; and the network output subunit 1342 is configured to input the combined feature to a fully connected network layer, and output the discrete encoding feature $q_i$ corresponding to the image representation feature $z_i$ according to a weight matrix in the fully connected network layer.

For specific embodiments of the splicing subunit 1341 and the network output subunit 1342, refer to step S103 in the embodiment corresponding to FIG. 3, and details are not described herein again.

In some embodiments, the semantic encoding information includes T semantic encoding features, the discrete encoding information includes T discrete encoding features, and the encoding similarity includes a first similarity and a second similarity, where T is a positive integer;

the parameter correction module 14 may include: a positive and negative sample determining unit 141, a model loss determining unit 142 and a network parameter correction unit 143;

the positive and negative sample determining unit 141 is configured to acquire a semantic encoding feature $c_i$ from the semantic encoding information, determine the discrete encoding feature $q_i$ in the discrete encoding information as a positive sample of the semantic encoding feature $c_i$, and a discrete encoding feature $q_j$ in the discrete encoding information as a negative sample of the semantic encoding feature $c_i$, where, i and j are positive integers less than or equal to T and are not equal;

the model loss determining unit 142 is configured to determine a model loss function corresponding to the text recognition model according to the first similarity between the semantic encoding feature $c_i$ and the positive sample and the second similarity between the semantic encoding feature $c_i$ and the negative sample; and the network parameter correction unit 143 is configured to correct the network parameters of the text recognition model according to the model loss function, and determine the feature extraction component with the corrected parameters and the image encoding component with the corrected parameters as a target text recognition model.

For specific embodiments of the positive and negative sample determining unit 141, the model loss determining unit 142 and the network parameter correction unit 143, refer to step S104 in the embodiment corresponding to FIG. 3, and details are not described herein again.

In some embodiments, the model loss determining unit 142 may include: a comparative loss determining subunit 1421, a diversity loss determining subunit 1422 and a loss connection subunit 1423;

the comparative loss determining subunit 1421 is configured to acquire the first similarity between the semantic encoding feature $c_i$ and the positive sample, the second similarity between the semantic encoding feature $c_i$ and the negative sample, and determine a contrastive loss function according to the first similarity and the second similarity;

the diversity loss determining subunit 1422 is configured to acquire logarithms corresponding to the code table index confidence coefficients according to the code table index confidence coefficients corresponding to the image representation information, and determine a diversity loss function according to products of the logarithms and the code table index confidence coefficients; and the loss connection subunit 1423 is configured to determine a model loss function corresponding to an initial text recognition model according to the contrastive loss function and the diversity loss function.

For specific embodiments of the comparative loss determining subunit 1421, the diversity loss determining subunit 1422 and the loss connection subunit 1423, refer to step S104 in the embodiment corresponding to FIG. 3, and details are not described herein again.

In some embodiments, the network parameter correction unit 143 may include: a training subunit 1431 and a model determining subunit 1432;

the training subunit 1431 is configured to correct the network parameters of the feature extraction component, the network parameters of the image encoding component and the code tables in the discrete encoding component according to the model loss function; and the model determining subunit 1432 is configured to determine the feature extraction component and the image encoding component meeting a training end condition as a target text recognition model when the number of times of training corresponding to the text recognition model meets the training end condition.

For specific embodiments of the training subunit 1431 and the model determining subunit 1432, refer to step S104 in the embodiment corresponding to FIG. 3, and details are not described herein again.

In embodiments, the text recognition model may further include a classification network layer;

the parameter correction module 14 may include: an unsupervised training unit 144, a labeled data acquiring unit 145, a semantic information output unit 146, a labeled data prediction unit 147 and a supervised fine adjustment unit 148;

the unsupervised training unit 144 is configured to correct the network parameters of the text recognition model according to the semantic encoding information and the discrete encoding information, and determine the feature extraction module with the corrected parameters and the image encoding module with the corrected parameters as a candidate text recognition model;

the labeled data acquiring unit 145 is configured to acquire labeled image data including text information, and input the labeled image data into the candidate text recognition model, were, the labeled image data carries tag information;

the semantic information output unit 146 is configured to output labeled semantic information corresponding to the labeled image data according to the feature extraction component with the corrected parameters and the image encoding component with the corrected parameters in the candidate text recognition model;

the labeled data prediction unit 147 is configured to predict the labeled semantic information according to the classification network layer to obtain a prediction text recognition result associated with the text information in the labeled image data; and the supervised fine adjustment unit 148 is configured to correct network parameters of the candidate text recognition model and the classification network layer according to an error between the tag information and the prediction text recognition result, and determine the candidate text recognition model with the corrected parameters and the classification network layer with the corrected parameters as a target text recognition model.

For specific embodiments of the unsupervised training unit 144, the labeled data acquiring unit 145, the semantic information output unit 146, the labeled data prediction unit 147 and the supervised fine adjustment unit 148, refer to step S104 in the embodiment corresponding to FIG. 3, and details are not described herein again.

In some embodiments, the feature extraction component includes L network layers, and L is a positive integer;

the feature extraction module 11 may include: an output result combined unit 111 and an image representation acquiring unit 112;

the output result combined unit 111 is configured to acquire output results of the image data in previous L−1 network layers in the feature extraction component of the text recognition model, and combine the output results corresponding to the previous L−1 network layers into a combined output result; and the image representation acquiring unit 112 is configured to obtain a target output result corresponding to the combined output result according to a weight matrix corresponding to a $L^{th}$ network layer in the feature extraction component, and determine the target output result as image representation information corresponding to the image data.

For specific embodiments of the output result combined unit 111 and the image representation acquiring unit 112, refer to step S101 in the embodiment corresponding to FIG. 3, and details are not described herein again.

In some embodiments, the semantic encoding module 12 may include: an attention layer calculation unit 121 and a text position encoding unit 122;

the attention layer calculation unit 121 is configured to perform, in the image encoding component of the text recognition model, product operation on the image representation information according to a weight matrix corresponding to a self-attention layer of the image encoding component to obtain an attention output vector corresponding to the image representation information; and the text position encoding unit 122 is configured to perform text position encoding on the attention output vector according to an encoding layer in the image encoding component to obtain the semantic encoding information corresponding to the image representation information.

For specific embodiments of the attention layer calculation unit 121 and the text position encoding unit 122, refer to step S101 in the embodiment corresponding to FIG. 3, and details are not described herein again.

In some embodiments, the image data processing apparatus may further include: a to-be-processed data acquiring module 15, a promotion feature extraction module 16, a promotion text semantic acquiring module 17 and a text recognition result acquiring module 18;

the to-be-processed data acquiring module 15 is configured to determine a business promotion picture including text information as to-be-processed image data and input the to-be-processed image data into the target text recognition model;

the promotion feature extraction module 16 is configured to output promotion representation information corresponding to the to-be-processed image data through the feature extraction component with the corrected parameters in the target text recognition model;

the promotion text semantic acquiring module 17 is configured to output promotion text semantic information corresponding to the promotion representation information through the image encoding component with the corrected parameters in the target text recognition model; and the text recognition result acquiring module 18 is configured to predict the promotion text semantic information according to the classification network layer in the target text recognition model to obtain promotion text content corresponding to the promotion text semantic information.

For specific embodiments of the to-be-processed data acquiring module 15, the promotion feature extraction module 16, the promotion text semantic acquiring module 17 and the text recognition result acquiring module 18, refer to step S104 in the embodiment corresponding to FIG. 3, and details are not described herein again.

In the embodiment of this application, a text recognition model may include a feature extraction component, an image encoding component and a discrete encoding component; the feature extraction component can acquire image representation information of image data, the image encoding component can obtain semantic encoding information through the image representation information, the discrete encoding component can obtain discrete encoding information through the discrete encoding component, then, network parameters of the text recognition model can be corrected through an encoding similarity between the semantic encoding information and the discrete encoding information, that is, the discrete encoding information can serve as a fitting target in the training process of the text recognition model, and annotation information of the image data does not need to be used in the above training process, which can reduce data annotation cost; and since unlabeled image data has diversity characteristics of a large data volume, a wide coverage area and the like, the unlabeled image data is directly used for training, which can improve generalization ability of the target text recognition model, to improve effectiveness of the target text recognition model and improve applicability of the target text recognition model.

Figure 10:
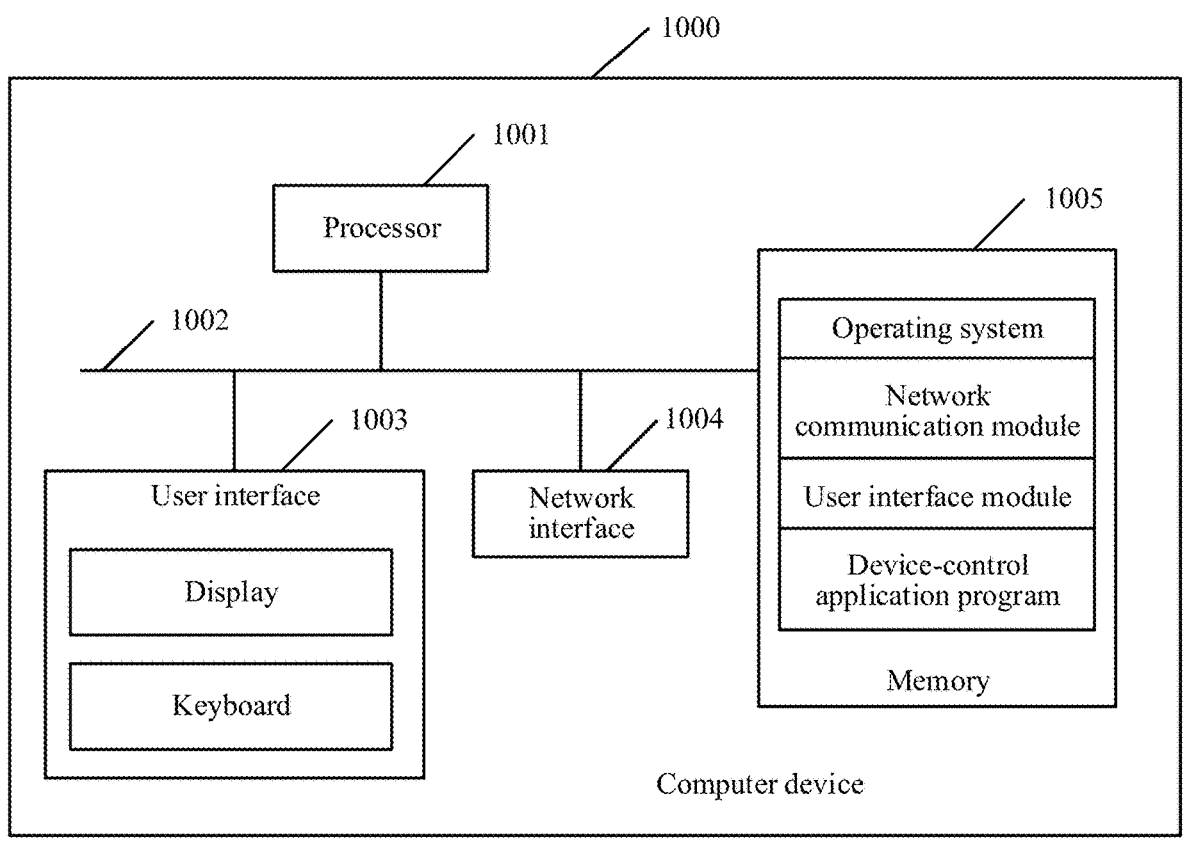
FIG. 10 is a schematic structural diagram of a computer device according to an embodiment of this application.

Refer to FIG. 10, and FIG. 10 is a schematic structural diagram of a computer device according to an embodiment of this application. As shown in FIG. 10, the computer device 1000 may include: a processor 1001, a network interface 1004 and a memory 1005, and in addition, the computer device 1000 may further include: a user interface 1003 and at least one communication bus 1002. The communications bus 1002 is configured to implement connection and communication between these components. The user interface 1003 may include a Display and a Keyboard. In some embodiments, the user interface 1003 may further include a standard wired interface and a standard wireless interface. In some embodiments, the network interface 1004 may include a standard wired interface and a standard wireless interface (e.g., a WI-FI interface). The memory 1005 may be a high-speed Random Access Memory (RAM), or may be a non-volatile memory, such as at least one magnetic disk memory. In some embodiments, the memory 1005 may also be at least one storage apparatus located away from the processor 1001. As shown in FIG. 10, the memory 1005 used as a computer-readable storage medium may include an operating system, a network communications module, a user interface module, and a device-control application program.

In the computer device 1000 shown in FIG. 10, the network interface 1004 may provide a network communication function; the user interface 1003 is mainly configured to provide an input interface for a user; and the processor 1001 may be configured to invoke the device-control application program stored in the memory 1005 so as to realize the above image data processing method.

It is to be understood that the computer device 1000 described in the embodiment of this application may execute the image data processing method described in the embodiment corresponding to FIG. 3 or the image data processing apparatus 1 described in the embodiment corresponding to FIG. 9, which is not repeated herein. In addition, the description of beneficial effects of the same method are not described herein again.

In addition, it is to be explained that: the embodiment of this application further provides a computer-readable storage medium. The computer-readable storage medium stores a computer program executed by the image data processing apparatus 1 mentioned above, and the computer program includes program instructions. When the processor executes the program instructions, the image data processing method described in the embodiment corresponding to FIG. 3 can be executed, which is not repeated herein. In addition, the description of beneficial effects of the same method are not described herein again. For technical details that are not disclosed in the embodiment of the computer-readable storage medium involved in this application, refer to the descriptions of the method embodiments of this application. As an example, the program instructions can be deployed on one computing device to be executed, or on a plurality of computing devices at one place to be executed, or a plurality of computing devices distributed in several places and connected through a communication network, and the plurality of computing devices distributed in the several places and connected through the communication network can constitute a blockchain system.

In addition, it is to be explained that the embodiment of this application further provides a computer program product or a computer program which may include computer instructions. The computer instructions can be stored in the computer-readable storage medium. The processor of the computer device reads the computer instructions from the computer-readable storage medium, and the processor can execute the computer instructions to enable the computer device to execute the image data processing method described in the embodiment corresponding to FIG. 3, which is not repeated herein. In addition, the description of beneficial effects of the same method are not described herein again. For technical details that are not disclosed in the embodiment of the computer program product or the computer program involved in this application, refer to the descriptions of the method embodiments of this application.

It is to be explained that, to simplify the description, the foregoing method embodiments are described as a series of action combination. But those skilled in the art need to know that this application is not limited to any described sequences of actions, as some steps can be executed in other sequences or executed at the same time according to this application. In addition, those skilled in the art need also know that all the embodiments described in the specification are exemplary embodiments, and the related actions and modules are not necessary to this application.

The flowcharts and block diagrams in the accompanying drawings illustrate possible system architectures, functions, and operations that may be implemented by the system, method, and computer program product according to various embodiments of this application. In this regard, each box in a flowchart or a block diagram may represent a module, a program segment, or a part of code. The module, the program segment, or the part of code includes at least one executable instruction used for implementing designated logic functions. In some embodiments, functions described in boxes may alternatively occur in a sequence different from what were described in an accompanying drawing. For example, two steps described in boxes shown in succession may be performed in parallel, and sometimes the steps in two boxes may be performed in a reverse sequence. This is determined by a related function. Each box in a block diagram and/or a flowchart, and a combination of boxes in the block diagram and/or the flowchart, may be implemented with a dedicated hardware-based system that performs specified functions or operations, or may be implemented with a combination of dedicated hardware and computer instructions.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

Those of ordinary skill in the art can understand that all or part of the processes of the method in the above embodiment may be implemented in a method that the computer program instructs related hardware. The computer program may be stored in the computer-readable storage medium. When the program is executed, the processes of the method in the above embodiment are performed. The storage medium may be a magnetic disc, an optical disc, a Read-Only Memory (ROM), or a Random Access Memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. An image data processing method, executed by a computer device, comprising:
   inputting image data comprising text information into a text recognition model, and acquiring image representation information corresponding to the image data according to a feature extraction component in the text recognition model;
   encoding the image representation information according to an image encoding component in the text recognition model to obtain semantic encoding information corresponding to the image representation information, the semantic encoding information being associated with the text information in the image data;
   acquiring discrete encoding information corresponding to the image representation information according to code tables in a discrete encoding component of the text recognition model, each code table comprising learnable encoded vectors representing text features, and the discrete encoding information being a fitting target for unsupervised learning; and
   correcting network parameters of the text recognition model according to an encoding similarity between the semantic encoding information and the discrete encoding information, and identifying the feature extraction component with corrected parameters and the image encoding component with corrected parameters as a target text recognition model, the target text recognition model being configured to recognize text information in image data.

2. The method according to claim 1, wherein the acquiring discrete encoding information corresponding to the image representation information according to code tables in a discrete encoding component of the text recognition model comprises:
   acquiring code table index confidence coefficients corresponding to the image representation information according to the code tables in the discrete encoding component of the text recognition model, the code table index confidence coefficients reflecting reliability of adopting the learnable encoded vectors to represent the image representation information; and
   acquiring the discrete encoding information corresponding to the image representation information from the code tables according to the code table index confidence coefficients.

3. The method according to claim 2, wherein the image representation information comprises T image representation features, each code table comprises V learnable encoded vectors, and both T and V are positive integers; and
   the acquiring code table index confidence coefficients corresponding to the image representation information according to the code tables in the discrete encoding component of the text recognition model, and the acquiring the discrete encoding information corresponding to the image representation information from the code tables according to the code table index confidence coefficients comprise:

acquiring an image representation feature $z_i$ for the code tables in the discrete encoding component of the text recognition model in the image representation information, i being a positive integer less than or equal to T;

acquiring code table index confidence coefficients between the image representation feature $z_i$ and the V learnable encoded vectors;

determining the learnable encoded vector corresponding to the largest code table index confidence coefficient in the V learnable encoded vectors as a target encoded vector; and determining a discrete encoding feature $q_i$ corresponding to the image representation feature $z_i$ according to the target encoded vector, and constituting the discrete encoding information through the discrete encoding features corresponding to the T image representation features.

4. The method according to claim 3, wherein the acquiring code table index confidence coefficients between the image representation feature $z_i$ and the V learnable encoded vectors comprises:

acquiring a distribution random number corresponding to a feature value in the image representation feature $z_i$, and adding the feature value in the image representation feature $z_i$ and the distribution random number to obtain a candidate representation feature corresponding to the image representation feature $z_i$; and acquiring code table index confidence coefficients between the candidate representation feature and the V learnable encoded vectors according to an index value corresponding to the feature value in the candidate representation feature.

5. The method according to claim 3, wherein the number of the code tables is G, each code table corresponds to a target encoded vector, and G is a positive integer; and the determining a discrete encoding feature $q_i$ corresponding to the image representation feature $z_i$ according to the target encoded vector comprises:

splicing the target encoded vectors in the G code tables to obtain a combined feature corresponding to the image representation feature $z_i$; and inputting the combined feature into a fully connected network layer, and outputting the discrete encoding feature $q_i$ corresponding to the image representation feature $z_i$ according to a weight matrix in the fully connected network layer.

6. The method according to claim 1, wherein the semantic encoding information comprises T semantic encoding features, the discrete encoding information comprises T discrete encoding features, the encoding similarity comprises a first similarity and a second similarity, and T is a positive integer; and the correcting network parameters of the text recognition model according to an encoding similarity between the semantic encoding information and the discrete encoding information, and identifying the feature extraction component with corrected parameters and the image encoding component with corrected parameters as a target text recognition model comprises:

acquiring a semantic encoding feature $c_i$ from the semantic encoding information, determining a discrete encoding feature $q_i$ in the discrete encoding information as a positive sample of the semantic encoding feature $c_i$, and a discrete encoding feature $q_j$ in the discrete encoding information as a negative sample of the semantic encoding feature $c_i$, i and j being positive integers less than or equal to T and being not equal;

determining a model loss function corresponding to the text recognition model according to a first similarity between the semantic encoding feature $c_i$ and the positive sample and a second similarity between the semantic encoding feature $c_i$ and the negative sample; and correcting the network parameters of the text recognition model according to the model loss function, and identifying the feature extraction component with the corrected parameters and the image encoding component with the corrected parameters as the target text recognition model.

7. The method according to claim 6, wherein the determining a model loss function corresponding to the text recognition model according to a first similarity between the semantic encoding feature $c_i$ and the positive sample and a second similarity between the semantic encoding feature $c_i$ and the negative sample comprises:

acquiring the first similarity between the semantic encoding feature $c_i$ and the positive sample, the second similarity between the semantic encoding feature $c_i$ and the negative sample, and determining a contrastive loss function according to the first similarity and the second similarity;

acquiring logarithms corresponding to code table index confidence coefficients according to the code table index confidence coefficients corresponding to image representation information, and determining a diversity loss function according to products of the logarithms and the code table index confidence coefficients; and determining the model loss function corresponding to the text recognition model according to the contrastive loss function and the diversity loss function.

8. The method according to claim 6, wherein the correcting the network parameters of the text recognition model according to the model loss function, and identifying the feature extraction component with the corrected parameters and the image encoding component with the corrected parameters as the target text recognition model comprises:

correcting network parameters of the feature extraction component, network parameters of the image encoding component and code tables in the discrete encoding component according to the model loss function; and identifying the feature extraction component and the image encoding component meeting a training end condition as a target text recognition model in a case that the number of times of training corresponding to the text recognition model meets the training end condition.

9. The method according to claim 1, wherein the text recognition model further comprises a classification network layer;

the correcting network parameters of the text recognition model according to an encoding similarity between the semantic encoding information and the discrete encoding information, and identifying the feature extraction component with corrected parameters and the image encoding component with corrected parameters as a target text recognition model comprises:

correcting the network parameters of the text recognition model according to the semantic encoding information and the discrete encoding information, and determining the feature extraction component with the corrected parameters and the image encoding component with the corrected parameters as a candidate text recognition model;

acquiring labeled image data comprising text information, and inputting the labeled image data into the candidate text recognition model, the labeled image data carrying tag information;

outputting labeled semantic information corresponding to the labeled image data according to the feature extraction component with the corrected parameters and the image encoding component with the corrected parameters in the candidate text recognition model;

predicting the labeled semantic information according to the classification network layer, and obtaining a prediction text recognition result associated with the text information in the labeled image data; and correcting network parameters of the candidate text recognition model and the classification network layer according to an error between the tag information and the prediction text recognition result, and identifying the candidate text recognition model with the corrected parameters and the classification network layer with the corrected parameters as a target text recognition model.

10. The method according to claim 1, wherein the feature extraction component comprises L network layers, and L is a positive integer; and the acquiring image representation information corresponding to the image data according to a feature extraction component in the text recognition model comprises:

acquiring output results of the image data in previous L−1 network layers in the feature extraction component of the text recognition model, and combine the output results corresponding to the previous L−1 network layers into a combined output result; and obtaining a target output result corresponding to the combined output result according to a weight matrix corresponding to an $L^{th}$ network layer in the feature extraction component, and determining the target output result as the image representation information corresponding to the image data.

11. The method according to claim 1, wherein the encoding the image representation information according to an image encoding component in the text recognition model to obtain semantic encoding information corresponding to the image representation information comprises:

performing, in the image encoding component of the text recognition model, product operation on the image representation information according to a weight matrix corresponding to a self-attention layer of the image encoding component to obtain an attention output vector corresponding to the image representation information; and performing text position encoding on the attention output vector according to an encoding layer in the image encoding component to obtain the semantic encoding information corresponding to the image representation information.

12. The method according to claim 1, further comprising:

determining a business promotion picture comprising text information as image data to be processed and inputting the image data to be processed into the target text recognition model;

outputting promotion representation information corresponding to the image data to be processed through the feature extraction component with the corrected parameters in the target text recognition model;

outputting promotion text semantic information corresponding to the promotion representation information through the image encoding component with the corrected parameters in the target text recognition model; and predicting the promotion text semantic information according to a classification network layer in the target text recognition model to obtain promotion text content corresponding to the promotion text semantic information.

13. An image data processing apparatus, comprising: a memory, and a processor coupled to the memory, the processor being configured to:

input image data comprising text information into a text recognition model, and acquire image representation information corresponding to the image data according to a feature extraction component in the text recognition model;

code the image representation information according to an image encoding component in the text recognition model to obtain semantic encoding information corresponding to the image representation information, the semantic encoding information being associated with the text information in the image data;

acquire discrete encoding information corresponding to the image representation information according to code tables in a discrete encoding component of the text recognition model, each code table comprising learnable encoded vectors representing text features, and the discrete encoding information being a fitting target for unsupervised learning; and correct network parameters of the text recognition model according to an encoding similarity between the semantic encoding information and the discrete encoding information and identify the feature extraction component with the corrected parameters and the image encoding component with the corrected parameters as a target text recognition model, the target text recognition model being configured to recognize text information in image data.

14. A non-transitory computer-readable storage medium, storing a computer program, wherein the computer program is applicable to being loaded and executed by a processor to enable a computer device with the processor to execute a method for processing image data, the method comprising:

inputting image data comprising text information into a text recognition model, and acquiring image representation information corresponding to the image data according to a feature extraction component in the text recognition model;

encoding the image representation information according to an image encoding component in the text recognition model to obtain semantic encoding information corresponding to the image representation information, the semantic encoding information being associated with the text information in the image data;

acquiring discrete encoding information corresponding to the image representation information according to code tables in a discrete encoding component of the text recognition model, each code table comprising learnable encoded vectors representing text features, and the discrete encoding information being a fitting target for unsupervised learning; and correcting network parameters of the text recognition model according to an encoding similarity between the semantic encoding information and the discrete encoding information, and identifying the feature extraction component with corrected parameters and the image encoding component with corrected parameters as a target text recognition model, the target text recognition model being configured to recognize text information in image data.

15. The computer-readable storage medium according to claim 14, wherein the acquiring discrete encoding information corresponding to the image representation information according to code tables in a discrete encoding component of the text recognition model comprises:
acquiring code table index confidence coefficients corresponding to the image representation information according to the code tables in the discrete encoding component of the text recognition model, the code table index confidence coefficients reflecting reliability of adopting the learnable encoded vectors to represent the image representation information; and
acquiring the discrete encoding information corresponding to the image representation information from the code tables according to the code table index confidence coefficients.

16. The computer-readable storage medium according to claim 15, wherein the image representation information comprises T image representation features, each code table comprises V learnable encoded vectors, and both T and V are positive integers; and
the acquiring code table index confidence coefficients corresponding to the image representation information according to the code tables in the discrete encoding component of the text recognition model, and the acquiring the discrete encoding information corresponding to the image representation information from the code tables according to the code table index confidence coefficients comprise:
acquiring an image representation feature $z_i$ for the code tables in the discrete encoding component of the text recognition model in the image representation information, i being a positive integer less than or equal to T;
acquiring code table index confidence coefficients between the image representation feature $z_i$ and the V learnable encoded vectors;
determining the learnable encoded vector corresponding to the largest code table index confidence coefficient in the V learnable encoded vectors as a target encoded vector; and
determining a discrete encoding feature $q_i$ corresponding to the image representation feature $z_i$ according to the target encoded vector, and constituting the discrete encoding information through the discrete encoding features corresponding to the T image representation features.

17. The computer-readable storage medium according to claim 16, wherein the acquiring code table index confidence coefficients between the image representation feature $z_i$ and the V learnable encoded vectors comprises:
acquiring a distribution random number corresponding to a feature value in the image representation feature $z_i$, and adding the feature value in the image representation feature $z_i$ and the distribution random number to obtain a candidate representation feature corresponding to the image representation feature $z_i$; and
acquiring code table index confidence coefficients between the candidate representation feature and the V learnable encoded vectors according to an index value corresponding to the feature value in the candidate representation feature.

18. The computer-readable storage medium according to claim 16, wherein the number of the code tables is G, each code table corresponds to a target encoded vector, and G is a positive integer; and
the determining a discrete encoding feature $q_i$ corresponding to the image representation feature $z_i$ according to the target encoded vector comprises:
splicing the target encoded vectors in the G code tables to obtain a combined feature corresponding to the image representation feature $z_i$; and
inputting the combined feature into a fully connected network layer, and outputting the discrete encoding feature $q_i$ corresponding to the image representation feature $z_i$ according to a weight matrix in the fully connected network layer.

19. The computer-readable storage medium according to claim 14, wherein the semantic encoding information comprises T semantic encoding features, the discrete encoding information comprises T discrete encoding features, the encoding similarity comprises a first similarity and a second similarity, and T is a positive integer; and
the correcting network parameters of the text recognition model according to an encoding similarity between the semantic encoding information and the discrete encoding information, and identifying the feature extraction component with corrected parameters and the image encoding component with corrected parameters as a target text recognition model comprises:
acquiring a semantic encoding feature $c_i$ from the semantic encoding information, determining a discrete encoding feature $q_i$ in the discrete encoding information as a positive sample of the semantic encoding feature $c_i$, and a discrete encoding feature $q_j$ in the discrete encoding information as a negative sample of the semantic encoding feature $c_i$, i and j being positive integers less than or equal to T and being not equal;
determining a model loss function corresponding to the text recognition model according to a first similarity between the semantic encoding feature $c_i$ and the positive sample and a second similarity between the semantic encoding feature $c_i$ and the negative sample; and
correcting the network parameters of the text recognition model according to the model loss function, and identifying the feature extraction component with the corrected parameters and the image encoding component with the corrected parameters as the target text recognition model.

20. The computer-readable storage medium according to claim 19, wherein the determining a model loss function corresponding to the text recognition model according to a first similarity between the semantic encoding feature $c_i$ and the positive sample and a second similarity between the semantic encoding feature $c_i$ and the negative sample comprises:
acquiring the first similarity between the semantic encoding feature $c_i$ and the positive sample, the second similarity between the semantic encoding feature $c_i$ and the negative sample, and determining a contrastive loss function according to the first similarity and the second similarity;
acquiring logarithms corresponding to code table index confidence coefficients according to the code table index confidence coefficients corresponding to image representation information, and determining a diversity loss function according to products of the logarithms and the code table index confidence coefficients; and determining the model loss function corresponding to the text recognition model according to the contrastive loss function and the diversity loss function.

* * * * *